United States Patent
Shahriar et al.

(10) Patent No.: US 11,146,349 B2
(45) Date of Patent: Oct. 12, 2021

(54) SYSTEM AND METHOD FOR ELASTIC OPTICAL NETWORKS

(71) Applicant: Huawei Technologies Canada Co., Ltd., Kanata (CA)

(72) Inventors: Nashid Shahriar, Kitchener (CA); Shihabur Rahman Chowdhury, Kitchener (CA); Raouf Boutaba, Waterloo (CA); Mubeen Zulfiqar, Waterloo (CA); Jeebak Mitra, Ottawa (CA); Mahdi Hemmati, Kanata (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 8 days.

(21) Appl. No.: 16/813,679

(22) Filed: Mar. 9, 2020

(65) Prior Publication Data
US 2021/0281350 A1 Sep. 9, 2021

(51) Int. Cl.
*H04J 14/02* (2006.01)
*H04Q 11/00* (2006.01)

(52) U.S. Cl.
CPC ...... *H04J 14/0227* (2013.01); *H04J 14/0278* (2013.01); *H04Q 11/0062* (2013.01); *H04Q 2011/0016* (2013.01); *H04Q 2011/0073* (2013.01); *H04Q 2011/0086* (2013.01)

(58) Field of Classification Search
CPC .... H04J 14/0227; H04J 14/0278; H04J 14/00; H04Q 11/0062; H04Q 2011/0073; H04Q 2011/0016; H04Q 2011/0086; H04Q 11/00; H04L 12/24; H04L 12/28; H04B 10/25

USPC .......................................................... 389/57
See application file for complete search history.

(56) References Cited

U.S. PATENT DOCUMENTS

| | | | | |
|---|---|---|---|---|
| 6,249,802 B1 * | 6/2001 | Richardson | ........... | G06F 9/5016 709/200 |
| 7,602,807 B2 * | 10/2009 | Zadikian | ............ | H04J 14/0227 370/395.21 |
| 8,160,574 B1 * | 4/2012 | Nelson | ................ | H04W 52/283 455/426.2 |
| 9,780,909 B2 * | 10/2017 | Wood | .................. | H04L 41/0896 |
| 9,813,301 B2 * | 11/2017 | Xu | .......................... | H04L 41/12 |
| 9,820,021 B2 * | 11/2017 | Friskney | ............... | H04B 10/25 |

(Continued)

OTHER PUBLICATIONS

Mohammad Hadi et al., "Dynamic Resource Allocation in Metro Elastic Optical Networks Using Lyapunov Drift Optimization" Jun. 6, 2019 (Year: 2019).*

(Continued)

*Primary Examiner* — Abbas H Alagheband
(74) *Attorney, Agent, or Firm* — BCF LLP

(57) ABSTRACT

The disclosed apparatuses and methods are directed to embedding of virtual links in an optical network. The method comprises: receiving an adaptation request for a virtual link within a virtual network embedded on an optical substrate network; generating a plurality of candidate embeddings based on a topology of the substrate network and a current embedding of the virtual link, each candidate embedding satisfying the adaptation request; determining a total cost of each candidate embedding based on a disruption cost of the candidate embedding; and selecting, as a new embedding, a candidate embedding from the plurality of candidate embeddings in accordance with the determined total cost of the selected candidate embedding.

12 Claims, 16 Drawing Sheets

(56) References Cited

U.S. PATENT DOCUMENTS

| | | | |
|---|---|---|---|
| 10,230,661 B2* | 3/2019 | Zhang | H04L 41/12 |
| 10,263,848 B2* | 4/2019 | Wolfing | H04L 41/145 |
| 10,547,563 B2* | 1/2020 | Zhang | H04L 41/0893 |
| 2015/0341709 A1* | 11/2015 | Friskney | H04L 45/70 |
| | | | 398/27 |
| 2016/0234061 A1* | 8/2016 | Wang | H04L 41/0803 |
| 2016/0234062 A1* | 8/2016 | Ghosh | H04B 10/27 |
| 2017/0195218 A1* | 7/2017 | Schrum, Jr. | H04L 45/02 |

OTHER PUBLICATIONS

Sangiin Hong et al., "Effective Virtual Optical Network Embedding Base on Topology Aggregation in Multi-Domain Optical Network" (Year: 2014).*

Shahriar et al., "Achieving a Fully-Flexible Virtual Network Embedding in Elastic Optical Networks" in IEEE INFOCOM, 2019.

Hadi Et al., "ynamic resource allocation in metro elas-tic optical networks using lyapunov drift optimization," Journal of Optical Communications and Networking, 2019, pp. 250-259, vol. 11, No. 6.

Christodoulopoulos et al., "Time-varying spectrum allocation policies and blocking analysis in flexible optical networks" IEEE Journal on Selected Areas in Communications, 2012, pp. 13-25, vol. 31, No. 1.

Klinkowski et al., "Elastic spectrum allocation for time-varying traffic in flexgrid optical networks" IEEE Journal on Selected Areas in Communications, 2012, pp. 26-38, vol. 31, No. 1.

Singh et al., "RADWAN: rate adaptive wide area network" in ACM SIGCOMM, 2018.

Tatsumi et al., "Disruption minimized spectrum defragmentation in elastic optical path networks that adopt distance adaptive modulation" in ECOC, 2011.

Ceccarelli et al., RFC8453: Framework for Abstraction and Control of TE Networks (ACTN), Aug. 2018.

* cited by examiner

SYSTEM AND METHOD FOR ELASTIC OPTICAL NETWORKS

CROSS-REFERENCE TO RELATED APPLICATIONS

This is the first application filed for the instantly disclosed technology.

FIELD OF THE INVENTION

The present invention generally relates to the field of communications and in particular to optical networks.

BACKGROUND

Conventional Dense Wavelength Division Multiplexing (DWDM) optical networks are capable of providing bandwidth of up to 4.4 THz in a C-band. Such networks generally employ fixed-grid spectrum and fixed-rate transceivers. As a result, these networks are less efficient at handling heterogeneous and variable traffic demands. In a conventional fixed-grid spectrum system, each block of allocated spectrum is either 50 GHz or 100 GHz wide. If channels larger than 100 GHz are required, the need can be met by bringing up multiple channels of 50 or 100 GHz. The channels can then be managed by a higher layer controller as a single logical link that is transparent to the end user. However, if only a small increase in the bandwidth of the channel is required, the additional capacity is wasted. In order to address an increasing demand for heterogeneous bandwidth connections, while maintaining an efficient spectrum utilization, a more flexible spectrum allocation may be provided by so-called "flex-grid spectral allocation for optical networks".

Flex-grid-based optical networks provide an effective way of increasing network-level operational efficiency by allowing the possibility of per-link bandwidth allocation using granular frequency slots. Such granular frequency slots may be as small as 12.5 GHz rather than the more monolithic 50 or 100 GHz per-link, as is the case in the conventional International Telecommunication Union (ITU) grid.

Elastic Optical Networks (EONs) are typically deployed using a combination of flex-grid spectral allocation and adaptive modulation and coding capabilities of flex-rate optical transceivers. EONs can be used to provide dynamic resource allocation in mesh-like optical networks to address dynamic, diverse and bursty traffic demands. Such traffic demands may be better addressed using EONs due to the inherent ability to increase or decrease the spectrum allocation in accordance with customer needs and to right-size the spectrum as per user requirements. Exploiting advances in coherent-transmission technology, EONs allow the tuning of transmission parameters such as baud rate, modulation format and forward error correction (FEC) overhead.

In the context of transport networks, a network slice is a virtual network (VN) that connects virtual nodes through virtual links that are embedded on the EON. VNs are typically requested by service providers (SPs) that specify parameter requirements including data rate, latency, and jitter requirements for each virtual link.

The demands placed on the resources of a VN may change over time due to variation in number of users and communication patterns. Consequently, the SP may request a modification of the parameters of one or more links of the VN. For example, the SP may request an increase in the allocated data rate of a virtual link that is carrying traffic.

Existing solutions for accommodating bandwidth increase requests rely on advanced techniques such as push-pull defragmentation in flexible optical networks and hop retuning technology. These techniques are still in developmental stages and it may be years before they can be used in commercial optical networks.

SUMMARY

An object of the present disclosure is to provide an apparatus and a method for dynamic adaptation of an elastic optical network (EON).

In accordance with this objective, an aspect of the present disclosure provides a method of adapting a virtual link in an optical network comprising: receiving an adaptation request for a virtual link within a virtual network embedded on an optical substrate network; generating a plurality of candidate embeddings based on a topology of the substrate network and a current embedding of the virtual link, each candidate embedding of the plurality of candidate embeddings satisfying the adaptation request; determining a total cost for each candidate embedding in the plurality of candidate embeddings, each total cost determined in accordance with a disruption cost associated with the candidate embedding; and selecting, as a new embedding, a candidate embedding from the plurality of candidate embeddings in accordance with the determined total cost of the selected candidate embedding.

In at least one embodiment, determining the total cost for each candidate embedding comprises determining a summation of a disruption cost of the candidate embedding and at least one of: a transponder cost for the candidate embedding and a frequency slot allocation cost for the candidate embedding.

In at least one embodiment, the summation is a weighted sum of the transponder cost the frequency slot allocation cost and the disruption cost.

In at least one embodiment, the optical network is an Elastic Optical network, and wherein the candidate embedding comprises at least one physical path, at least one split being mapped to the at least one physical path, each split having a transmission configuration tuple, each split having at least one contiguous frequency slot, and, wherein: the disruption cost of the candidate embedding is a sum of the disruption costs associated with each split, and the disruption cost of a split being the product of a disruption cost coefficient c($\widetilde{e}$ptis) multiplied by a frequency slot decision variable $y_{\widetilde{e}ptis}$.

In at least one embodiment, the disruption cost of the candidate embedding is further determined by multiplying the sum of the disruption cont associated with each split by a product of a third cost constant and a sum of an expansion spectrum variable $\mu_{\widetilde{e}}$ and a reduction of spectrum variable $\sigma_{\widetilde{e}}$.

In at least one embodiment, the disruption cost coefficient c($\widetilde{e}$ptis) of the candidate split is zero if the candidate physical path of the candidate split coincides with a respective current physical path, a transmission configuration tuple that is identical to a transmission configuration tuple of the candidate split of a respective current split, and each candidate frequency slot of the at least one contiguous candidate frequency slot of the candidate split coincides with one current frequency slot of at least one current contiguous frequency slot allocated to the respective current split; the disruption cost coefficient c($\widetilde{e}$ptis) of the candidate split is equal to a first cost constant if at least one element of one transmission configuration tuple of the candidate split differs from a respective element of the transmission configuration tuple of the respective current split, and each candidate frequency slot of the candidate split coincides with a respective one current frequency slot of the respective current split; the disruption cost coefficient c(ẽptis) of the candidate split is equal to a second cost constant if each one of the at least one candidate contiguous frequency slot of the candidate split is mapped to one of unallocated contiguous frequency slots, the unallocated contiguous frequency slots being unallocated to any virtual link of the plurality of virtual links, the second cost constant being larger than the first cost constant; the disruption cost coefficient c(ẽptis) of the candidate split is equal to a third cost constant if the candidate physical path coincides with the current physical path, and at least one of the at least one candidate contiguous frequency slot of the candidate split overlaps with at least one current frequency slot allocated to the current split and overlaps with at least one of the plurality of currently unallocated contiguous frequency slots, the third cost constant being larger than the second cost constant; the disruption cost coefficient c(ẽptis) of the candidate split is equal to the third cost constant if: the candidate physical path coincides with the current physical path, each one of the at least one of candidate frequency slots of the candidate split comprises at least one current frequency slot, and a candidate spectral bandwidth of the candidate split is narrower than a current spectral bandwidth of the respective current split; the disruption cost coefficient c(ẽptis) of the candidate split is equal to a fourth cost constant if the candidate spectral bandwidth of the candidate split at least partially overlaps with the current spectral bandwidth of the current split of the virtual link, the fourth cost constant being larger than the third cost constant; and the disruption cost coefficient c(ẽptis) of the candidate split is significantly larger than the fourth cost constant if the candidate spectral bandwidth overlaps with at least one of an allocated plurality of frequency slots that is allocated to one of the plurality of virtual links of EON.

In at least one embodiment, the current embedding comprises current splits, each current split having a current transmission configuration, and wherein generating the plurality of candidate embeddings further comprises: generating a plurality of preliminary embeddings, each preliminary embedding of the plurality of preliminary embeddings having a preliminary subset of splits; and for each preliminary embedding: determining the preliminary subset of splits based on a current subset of splits of the current embedding, contiguous preliminary frequency slots of each one of the at least one split of the preliminary subset of splits being identical to contiguous current frequency slots of a respective current split, assigning a new transmission configuration to at least one split of the preliminary subset of splits, the new transmission configuration having a reach longer than a path length of a physical path of a given split of the preliminary subset of splits; determining a total data rate achievable by the preliminary embedding; and responsive to determining that the total data rate is equal to or higher than a modified data rate received in the adaptation request, mapping the preliminary embedding to a first candidate embedding of the plurality of candidate embeddings.

In at least one embodiment, assigning the new transmission configuration comprises selecting the new transmission configuration from a reach table.

In at least one embodiment, the method further comprises: generating a plurality of complementary embeddings, each complementary embedding having a complementary subset of splits; and for each complementary embedding: determining the complementary subset of splits based on the current subset of splits and based on frequency slots unallocated to the current embedding of the virtual link and unallocated to any other virtual link of the plurality of virtual links of the EON, all of the at least one complementary contiguous frequency slot of each split of the complementary subset of splits being currently unallocated to the virtual link and unallocated to any other virtual link of the plurality of virtual links of the EON; assigning a transmission configuration to at least one split of the complementary subset of splits, the transmission configuration of the at least one split of the complementary subset of splits having a reach longer than or equal to the path length of the physical path of the at least one split of the complementary subset of splits; determining a total data rate achievable by the complementary embedding; and in response to the total data rate achievable by the complementary embedding being equal to or higher than the modified data rate, and in response to a number of complementary splits being equal to or less than the maximum number of splits, mapping the complementary embedding to a second candidate embedding of the plurality of candidate embeddings. In at least one embodiment, the disruption cost is determined based on a disruption cost coefficient, and the disruption cost coefficient assigned to the first candidate embedding is higher than the disruption cost coefficient assigned to the second candidate embedding.

In at least one embodiment, the method further comprises: generating at least one mixed embedding, each mixed embedding having a mixed subset of splits; and for each mixed embedding: determining the mixed subset of splits based on: the current subset of splits, current contiguous frequency slots, and frequency slots that are unallocated to the current embedding of the virtual link and unallocated to any other virtual link of the plurality of virtual links of the EON, contiguous mixed frequency slots of each one of the at least one split of the mixed subset of splits comprising at least one of the contiguous current frequency slots and frequency slots that are unallocated to the current embedding of the virtual link and unallocated to any other virtual link of the plurality of virtual link of the EON; assigning a mixed transmission configuration to at least one split of the mixed subset of splits, the mixed transmission configuration having a reach longer than or equal to a path length of the physical path of the at least one split of the mixed subset of splits; determining a total data rate achievable by the mixed embedding; and in response to the total data rate achievable by the mixed embedding being equal to or higher than the modified data rate, and in response to a number of mixed splits of the mixed embedding being equal to or less than the maximum number of splits, mapping the mixed embedding to a third candidate embedding of the plurality of candidate embeddings.

In at least one embodiment, the disruption cost is determined based on a disruption cost coefficient, and the disruption cost coefficient assigned to the second candidate embedding is higher than the disruption cost coefficient assigned to the first candidate embedding.

In accordance with another aspect of the present technology, there is provided a network controller comprising: a processor for executing instructions; and a memory for storing instructions, which when executed by the processor configure the system to perform operations comprising: receiving an adaptation request for a virtual link within a virtual network embedded on an optical substrate network; generating a plurality of candidate embeddings based on a topology of the substrate network and a current embedding of the virtual link, each candidate embedding of the plurality of candidate embeddings satisfying the adaptation request; determining a total cost for each candidate embedding in the plurality of candidate embeddings, each total cost determined in accordance with a disruption cost associated with the candidate embedding; and selecting, as a new embedding, a candidate embedding from the plurality of candidate embeddings in accordance with the determined total cost of the selected candidate embedding.

In at least one embodiment, the total cost of the candidate embedding is determined based on a sum of the disruption cost of the candidate embedding and at least one of: a transponder cost for the candidate embedding and a frequency slot allocation cost for the candidate embedding.

In at least one embodiment, the network is an elastic optical network, and wherein the candidate embedding comprises at least one physical path, at least one split being mapped to the at least one physical path, each split having a transmission configuration tuple, each candidate split having at least one f contiguous allocated candidate frequency slot, and, wherein the disruption cost of the candidate embedding is a sum of the distruption costs associated with each split and the disruption costs of a split being a product of a disruption cost coefficient $c(\overline{e}ptis)$ multiplied by a frequency slot decision variable $y_{\overline{e}ptis}$.

In at least one embodiment, the instructions, when executed by the processor, further configure the system to perform operations comprising: generating a plurality of complementary embeddings, each complementary embedding having a complementary subset of splits; and for each complementary embedding: determining the complementary subset of splits based on the current subset of splits and based on frequency slots unallocated to the current embedding of the virtual link and unallocated to any other virtual link of the plurality of virtual links of the EON, all of the at least one complementary contiguous frequency slot of each split of the complementary subset of splits being currently unallocated to the virtual link and unallocated to any other virtual link of the plurality of virtual links of the EON; assigning a transmission configuration to at least one split of the complementary subset of splits, the transmission configuration of the at least one split of the complementary subset of splits having a reach longer than or equal to the path length of the physical path of the at least one split of the complementary subset of splits; determining a total data rate achievable by the complementary embedding; and in response to the total data rate achievable by the complementary embedding being equal to or higher than the modified data rate, and in response to a number of complementary splits of the new candidate embedding being equal to or less than a maximum number of splits, mapping the complementary embedding to a second candidate embedding of the plurality of candidate embeddings.

Implementations of the present disclosure each have at least one of the above-mentioned object and/or aspects, but do not necessarily have all of them. It should be understood that some aspects of the present disclosure that have resulted from attempting to attain the above-mentioned object may not satisfy this object and/or may satisfy other objects not specifically recited herein.

Additional and/or alternative features, aspects and advantages of implementations of the present disclosure will become apparent from the following description, the accompanying drawings and the appended claims.

BRIEF DESCRIPTION OF THE FIGURES

Further features and advantages of the present disclosure will become apparent from the following detailed description, taken in combination with the appended drawings, in which.

Figure 1A:
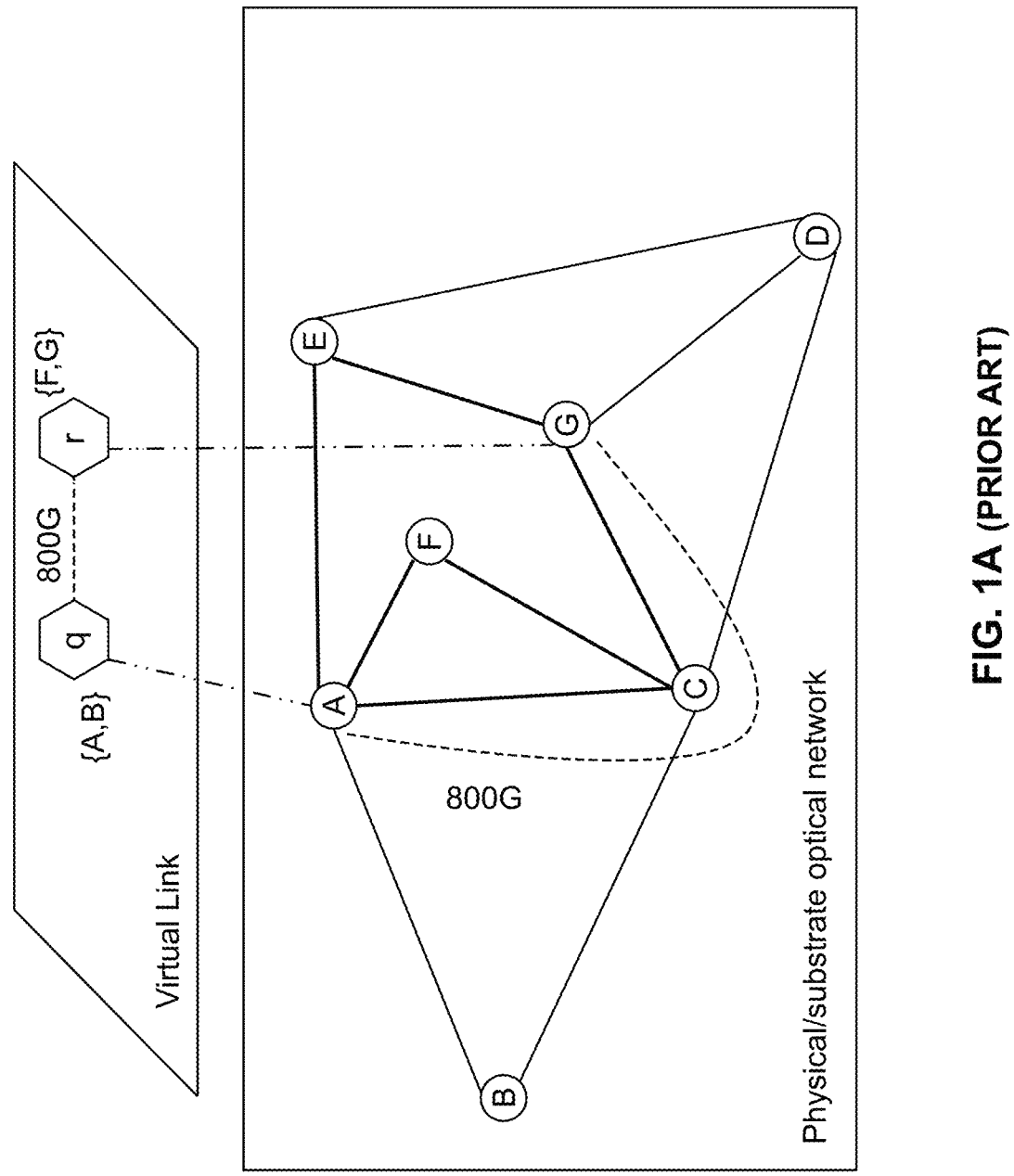
FIG. 1A depicts a block diagram illustrating a physical optical network supporting an embedded virtual link.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current techniques for adaptation of elastic networks. In particular, the instant disclosure describes an apparatus, and method that can be used to reduce disruption caused to optical network traffic by adaptation of VN link embeddings in response to a request to modify a parameter of the VN link.

As used herein, the term "elastic optical network" refers to a physical network that may host one or more virtual networks or alternatively the virtual networks are said to be 'embedded' on the substrate optical network. It will be appreciated that although the example embodiments discussed below make use of the features of EONs, both flex-grid and fixed-grid optical networks could also be used. Such implementations may not be able to offer all the performance benefits that could be offered by implementations using EONs, but the methods disclosed herein can still provide benefit over not using the disclosed methods.

A virtual network is a logical structure that appears to the entities of the virtual network as a contained physical network having its own topology. Virtual nodes are connected to each other using virtual links that define the topology of the virtual network. The topology of the virtual network may be different from the topology of the substrate network from whose resources the virtual network is created. Nodes of a virtual network are necessarily instantiated upon the nodes of the substrate network. The virtual links connecting these virtual nodes can traverse one or more physical paths between the computing resources upon which the virtual nodes are instantiated. Each of the physical paths may be composed of a plurality of physical links (although there is no restriction on the physical path being a single hop). As used herein, the term "embedding" refers to the mapping of a virtual link on to a physical network using a unique configuration. A specific embedding defines the parameters of the virtual link through a mapping to the resources of the underlying substrate links. A virtual network embedding may be considered to be a set of different embeddings, some representing the mapping of the virtual nodes to the resources upon which they are instantiated, and a set of embedding associated with the virtual links representing the substrate network links that they are created using. When the traffic of a virtual link is split across a plurality of physical paths between the source and destination nodes, splitting between the physical paths is allowed. The embedding associated with the virtual link may further comprise a number of splits, each split corresponding to the mappings associated with the lightpath from the source to the destination using segments of the physical path used to create the virtual link. Where a physical path goes through a physical node, the path may be considered to have a plurality of segments, each segment being the path between adjacent nodes. The aggregate data rate over the splits of a virtual link is equal to (or greater than) the total requested virtual link data rate. The virtual network embedding may further comprise parameters of each split, for example, a transmission configuration tuple and the frequency slot(s) allocated to each split within a spectral bandwidth of a respective physical path. One split or may comprise one or more intermediate physical links (e.g. segments). The terms "spectral bandwidth" and "frequency bandwidth" are used herein interchangeably.

As used herein, the term "frequency slot" refers to a portion of a spectrum that may be allocated to a VLink on a particular split. A single frequency slot is typically the narrowest frequency bandwidth that can be allocated on a link. For example, one frequency slot may be 25 GHz. VLink may be associate with a plurality of different frequency slots on a single physical link. In some embodiments the frequency slots allocated to a Vlink are contiguous, while in others the frequency slots are disjoint from each other.

When a Vlink has contiguous frequency slots on a single physical link, they can be allocated to one split. Such a split has a plurality of contiguous frequency slots.

When the frequency slots allocated to a VLink on a single physical link are disjoint, then each contiguous set of frequency slots in the disjoint set can be grouped together an assigned to a different split. Thus, a plurality of different splits within the same VLink can be embedded in a single physical link. In one such embodiment, a first split has a set of contiguous frequency slots, and a second split has a second set of contiguous frequency slots. The two sets of contiguous frequency slots are disjoint from each other (i.e. there is at least one frequency slot between the first and second sets of contiguous frequency slots).

Below, reference will be made to a "transmission configuration tuple". The tuple may be associated with a single split. The tuple is a representation of configuration parameters associated with the split. In some embodiments, the tuple may also contain an identifier of the split itself, the physical link associated with the split and the VLink along with other such information. The configuration parameters in a tuple may vary with the implementation, but can include one of more of data-rate d, baud rate b, modulation format m, forward error correction (FEC) overhead f. In other embodiments, the tuple may have parameters associated with characteristics such as spectrum bandwidth and a reach metric.

FIG. 1A is a block diagram illustrating a physical optical network on which a virtual network may be embedded. A virtual network comprising virtual nodes q and r is to be instantiated upon a physical/substrate optical network comprising of substrate optical nodes A, B, C, D, E, F, and G. The location constraints associated with the virtual node q limit its placement to one of substrate optical nodes A and B, the location constraints associated with the virtual node r are substrate optical nodes F and G. There may be a number of reasons for such location constraints, but they are typically business decisions, requirements for proximity to particular locations, or are based on the availability of specific hardware.

Further, a data rate associated with the virtual link between virtual nodes q and r is 800 Gbps. In order to embed the virtual link between virtual nodes q and r, in this example, the virtual node q is mapped to the substrate node A and the virtual node r is mapped to substrate node G. The primary substrate path provisioning the virtual link is through the links that connect substrate node A to substrate node C, and substrate node C to substrate node G with associated data rate of 800 Gbps.

Figure 1B:
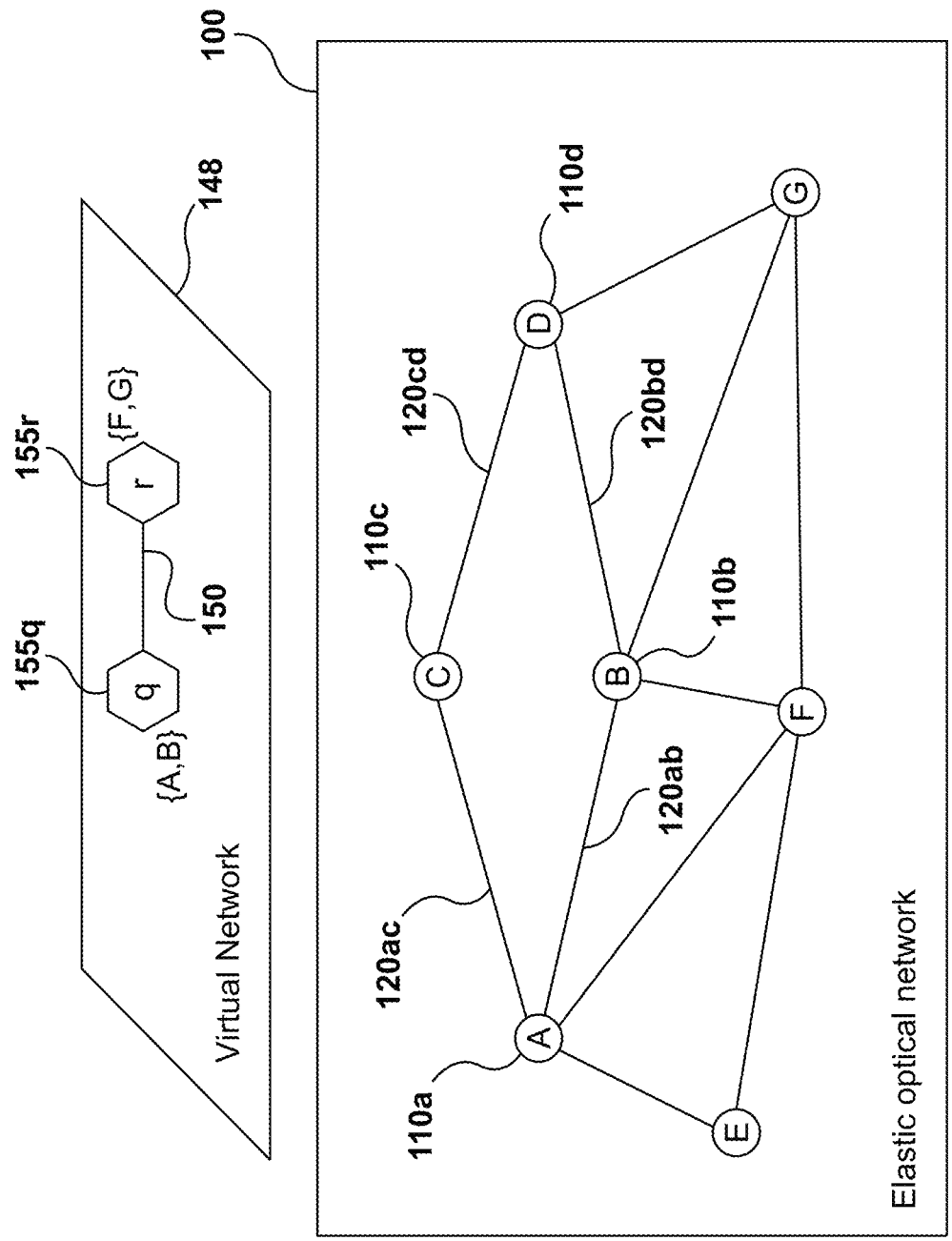
FIG. 1B depicts an example of an elastic optical network having a virtual link between virtual nodes.

FIG. 1B depicts an example of a substrate network 100, in accordance with various embodiments of the present disclosure. Network 100 has five nodes: Node A 110a, Node B 110b, Node C 110c, and node D 110d. The nodes 110a ... 110d are connected by links 120ab, etc. Each link may carry information within a link spectral bandwidth.

If network 100 is a fixed-grid fixed-modulation optical network, network configuration parameters would typically be fixed following physical implementation of network 100. For example, the modulation format (for example, quadrature phase-shift keying (QPSK)) and forward error correction (FEC) overhead would be fixed. The channels in such network 100 could have channel bandwidths of, for example, 50 GHz and 100 GHz.

In the following discussion, network 100 will be considered to be an elastic optical network (EON). Accordingly, links within the EON may operate using various modulation formats, data rates, spectrum bandwidths, FEC overheads and consequently effective reach. The network 100 is also referred to herein as "EON 100" or "substrate EON 100".

FIG. 1B depicts a non-limiting example of a VN 148 having node q 155q and node r 155r connected by virtual link (VLink) 150. The nodes and links of VN 148 are embedded in the EON 100 with a previously set data rate. For example, VLink 150 may have a current data rate of 400 Gbps. Those skilled in the art will appreciate that VN 148 is an intentionally simplified network. More complex networks with a plurality of nodes and links can be embedded. Furthermore a plurality of virtual networks can be embedded upon substrate network 100.

Figure 2:
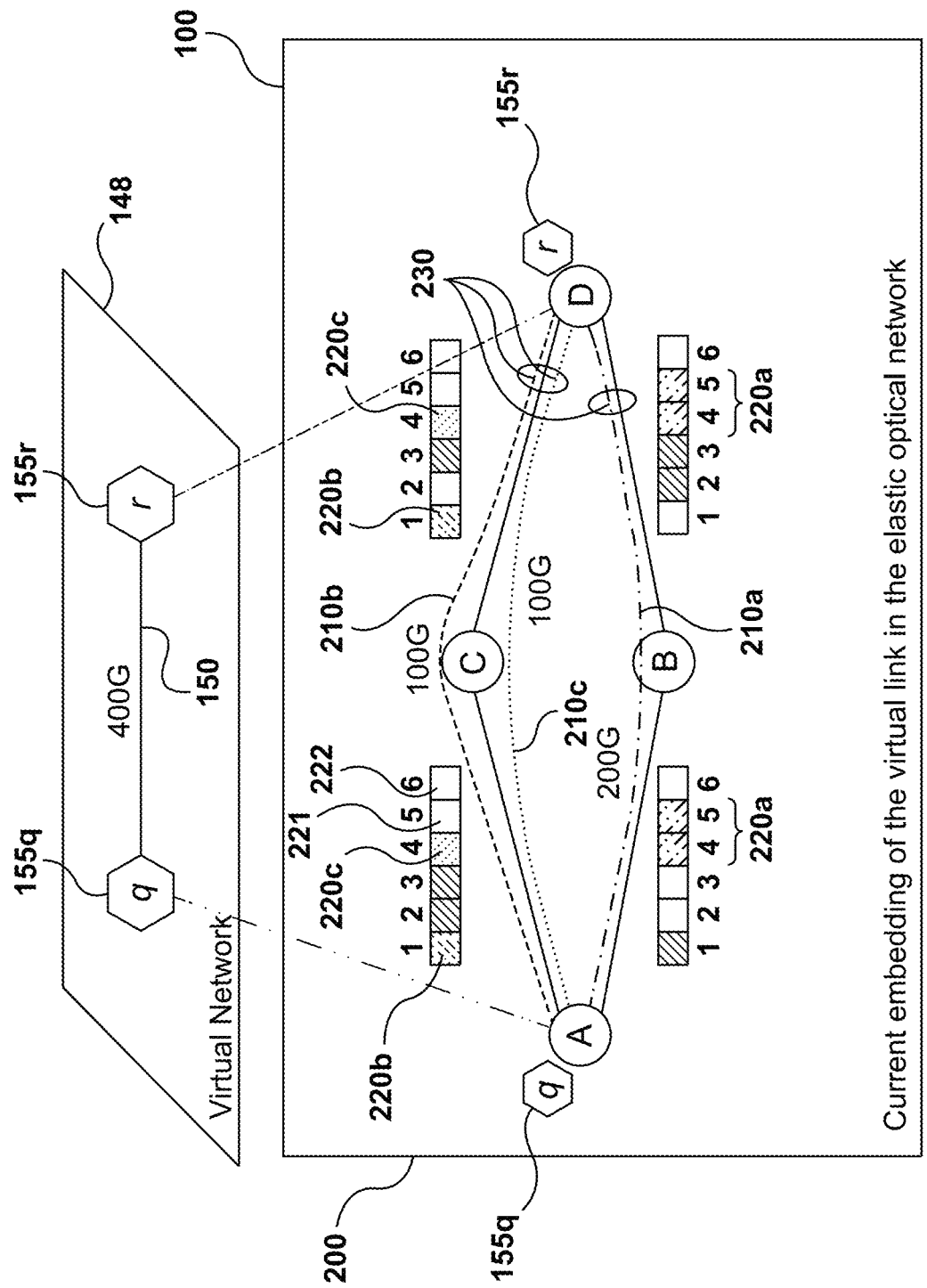
FIG. 2 schematically depicts a current embedding of a virtual link on an elastic optical network, in accordance with various embodiments of the present disclosure.

FIG. 2 schematically depicts a first embedding 200 (also referred to herein as a "current embedding 200") of VN 148 on EON 100. In the following discussion, the first embedding 200 will be treated as a baseline from which modification will be made. As such, it will also be referred to as current embedding 200. The current embedding 200 of VLink 150 comprises three current splits: a first current split 210a, a second current split 210b, and a third current split 210c.

VNode q, 155q is embedded on substrate node A. Vnode 155r, 155r is embedded on substrate node D. In VN 148, Vnode q 155q is connected to VNode r 155r by VLink 150. Vlink 150 is shown as having a supported data rate of 400 Gbps. To provide the connectivity required, VLink 150 will be embedded on physical or substrate links that can support its requirements. Each split within VLink 105 will have transmission configuration parameters such as baud-rate, modulation format, and FEC overhead and a data rate Each transmission configuration has a spectrum requirement and a maximum optical reach within which the transmission configuration may be used with satisfactory signal quality. The data rates provided by the set of splits in the VLink should aggregate to provide the required data rate.

The first current split 210a is embedded on a lightpath from node A to node D through node B. This split 210a has data rate of 200 gigabit per second (Gbps). The second current split 210b is embedded on a lightpath from Node A to Node D through Node C and has data rate of 100 Gbps. T third current split 210c is embedded om a lightpath from Node A to Node D through Node C, has data rate of 100 Gbps. The second and third splits are carried on the same sets of physical links, but are different splits because they are provided on different sets of contiguous frequency slots. These three splits correspond to three lightpaths established on EON 100. FIG. 2 also illustrates current frequency slot allocations 220a, 220b, and 220c assigned to each one of the current splits 210a, 210b, and 210c, respectively. The first current split 210a is assigned to frequency slots 220a on path ABD. The second current split 210b is assigned to frequency slots 220b on path ACD. The third current split 210c is assigned to frequency slot 220c on path ACD. As illustrated in this embodiment, where possible, a VLink that spans a number of successive physical links, will have splits associated with each of those links that use the same frequency slots on each link. This is referred to as a spectrum contiguity constraint. As noted above, where possible, in this embodiment, spectrum frequency slots of the same split in a given physical path are adjacent to each other, which is referred to as a spectrum contiguity constraint.

A spectrum contiguity constraint ensures that all contiguous frequency slots allocated to a VLink will be in a single split. A spectrum continuity constraint will minimize the processing that an intermediate physical node has to undertake to forward data traffic associated with the VLink. The number of splits will increase if there is an insufficient number of contiguous frequency slots, or an insufficient number of continuous frequency slots across the lightpath (subject to an optional maximum number of splits as will be discussed below).

With reference to FIG. 2, for a physical path ABD, the intermediate physical links are AB and BD. The first split 210a fulfills the spectrum continuity constraint by having the same frequency slots 220a both in the intermediate physical link AB and BD.

Table 1 depicts a non-limiting example of embedding parameters that may be used for embedding 200 of Vlink 150, in accordance the illustrated embodiment of FIG. 2. It should be understood that an embedding may have one or more splits. A maximum number of splits for each VLink may be determined by a customer's request or as per a pre-defined criteria.

| | Data Rate (Gbps) | Modulation Format | FEC overhead (%) | Spectrum Bandwidth (GHz) | Reach (kms) |
|---|---|---|---|---|---|
| first current split 210a | 100 | QPSK 16QAM | 25% 20% | 50 25 | 2000 1250 |
| second current split 210b | 200 | QPSK 32QAM | 25% 20% | 75 37.5 | 1000 400 |
| third current split 210c | 200 | QPSK 32QAM | 25% 20% | 75 37.5 | 1000 400 |

Figure 3:
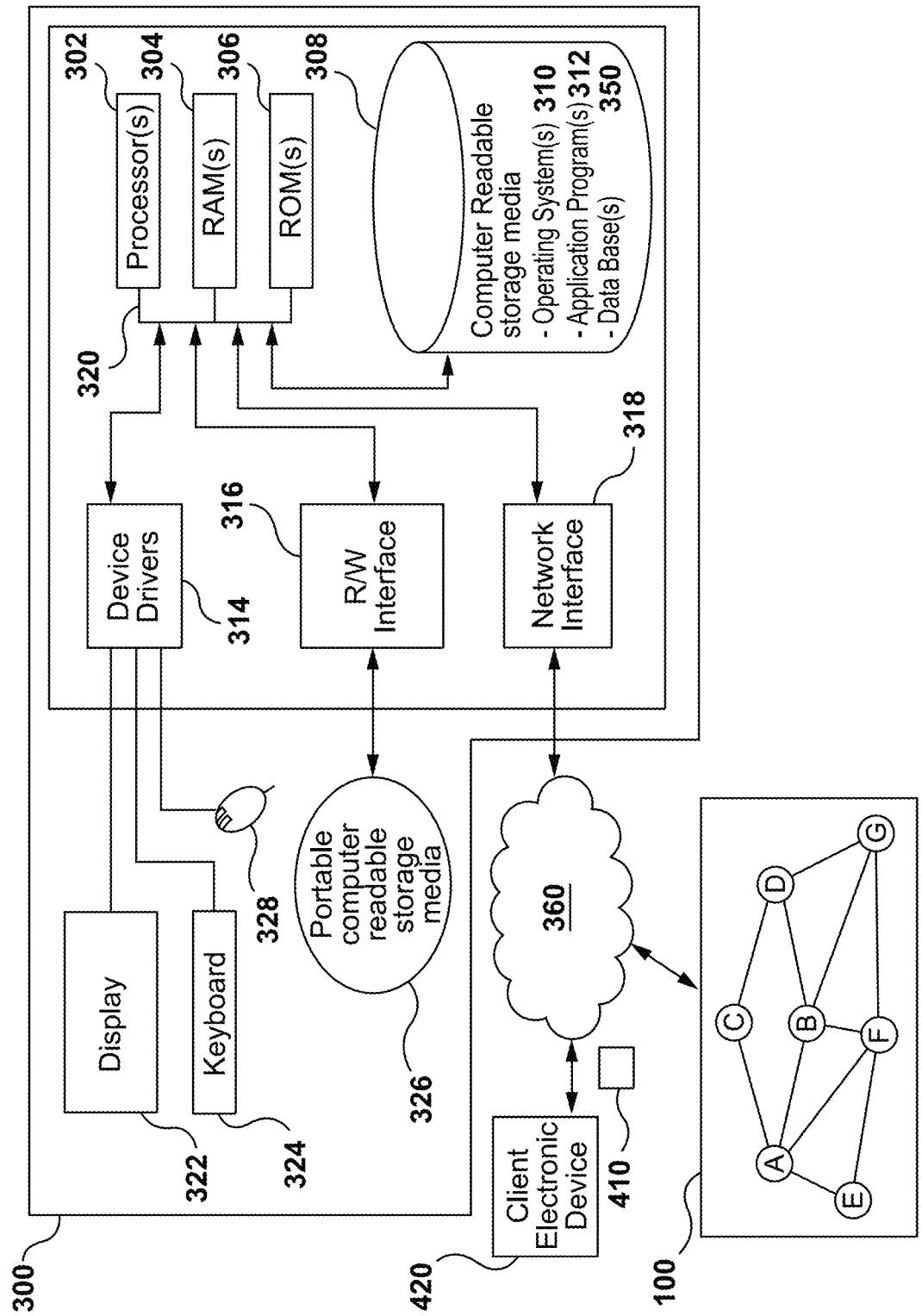
FIG. 3 depicts a high-level block diagram of representative components of an embodiment of an apparatus to perform a network adaptation, in accordance with various embodiments of the present disclosure.

FIG. 3 is a block diagram illustrating a high-level representation of components of a network processing element used to manage the adaption of the embedding of VNs or VLinks associated with VNs. The network adaptation controller 300 is configured to adapt a network embedding based on a network adaptation request as described herein below. It will be understood that the representation of network adaption controller 300 is provided for the purposes of explanation, and the particular implementation can vary. In some embodiments, controller 300 may be a provided through a distributed processing implementation in which the constituent elements are not necessarily provided within a single node. It should be appreciated that the illustrated embodiment of FIG. 3 provides only an illustration of one implementation of the network adaptation controller 300 and is not intended to imply any limitations with regards to the environments in which different embodiments may be implemented.

As shown, the network adaptation controller 300 has one or more processors 302, one or more computer-readable random access memories (RAMs) 304, one or more computer-readable read only memories (ROMs) 306, one or more computer-readable storage media 308, device drivers 314, a read/write (R/W) interface 316, a network interface 318, all interconnected over a communications fabric 320. The communications fabric 320 may be implemented with any architecture designed for passing data and/or control information between processors (such as microprocessors, communications and network processors, etc.), memory, peripheral devices, and any other hardware components within a system.

The one or more operating system(s) 310 and the one or more application program(s) 312 are stored on one or more of the computer-readable storage media 308 for execution by the one or more of the processors 302 via the one or more of the respective RAMs 304 (which typically include a cache memory). In the illustrated embodiment, each of the computer-readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The network adaptation controller 300 may also include optional components such as the R/W drive or interface 316 to read from and write to one or more portable computer-readable storage media 326. Application programs 312 on said devices may be stored on one or more of the portable computer-readable storage media 326, read via the respective R/W drive or interface 316 and loaded into the respective computer-readable storage media 308.

The application programs 312 on the network adaptation controller 300 may be downloaded to the network adaptation controller 300 from an external computer or external storage device via a communication network 360 (for example, the Internet, a local area network or other wide area network or wireless network) and network interface 318. From the network interface 318, the programs may be loaded onto computer-readable storage media 308. Various databases 350 as described herein may be stored in the computer-readable storage media 308.

In many embodiments, the network adaptation controller 300 is provided through software on a server that is accessed remotely. In other embodiments, network adaptation controller 300 may also include a display screen 322, a keyboard or keypad 324, and a computer mouse or touchpad 328. The device drivers 314 may interface to display screen 322 for imaging, to keyboard or keypad 324, to computer mouse or touchpad 328, and/or to display screen 322 (in case of touch screen display) for pressure sensing of alphanumeric character entry and user selections. The device drivers 314, R/W interface 316 and network interface 318 may comprise hardware and software (stored on computer-readable storage media 308 and/or ROM 306).

The programs described herein are identified based upon the application for which they are implemented in a particular embodiment of the present disclosure. However, it should be appreciated that any particular program nomenclature herein is used merely for convenience, and thus the disclosure should not be limited to use solely in any specific application identified and/or implied by such nomenclature.

Figure 4A:
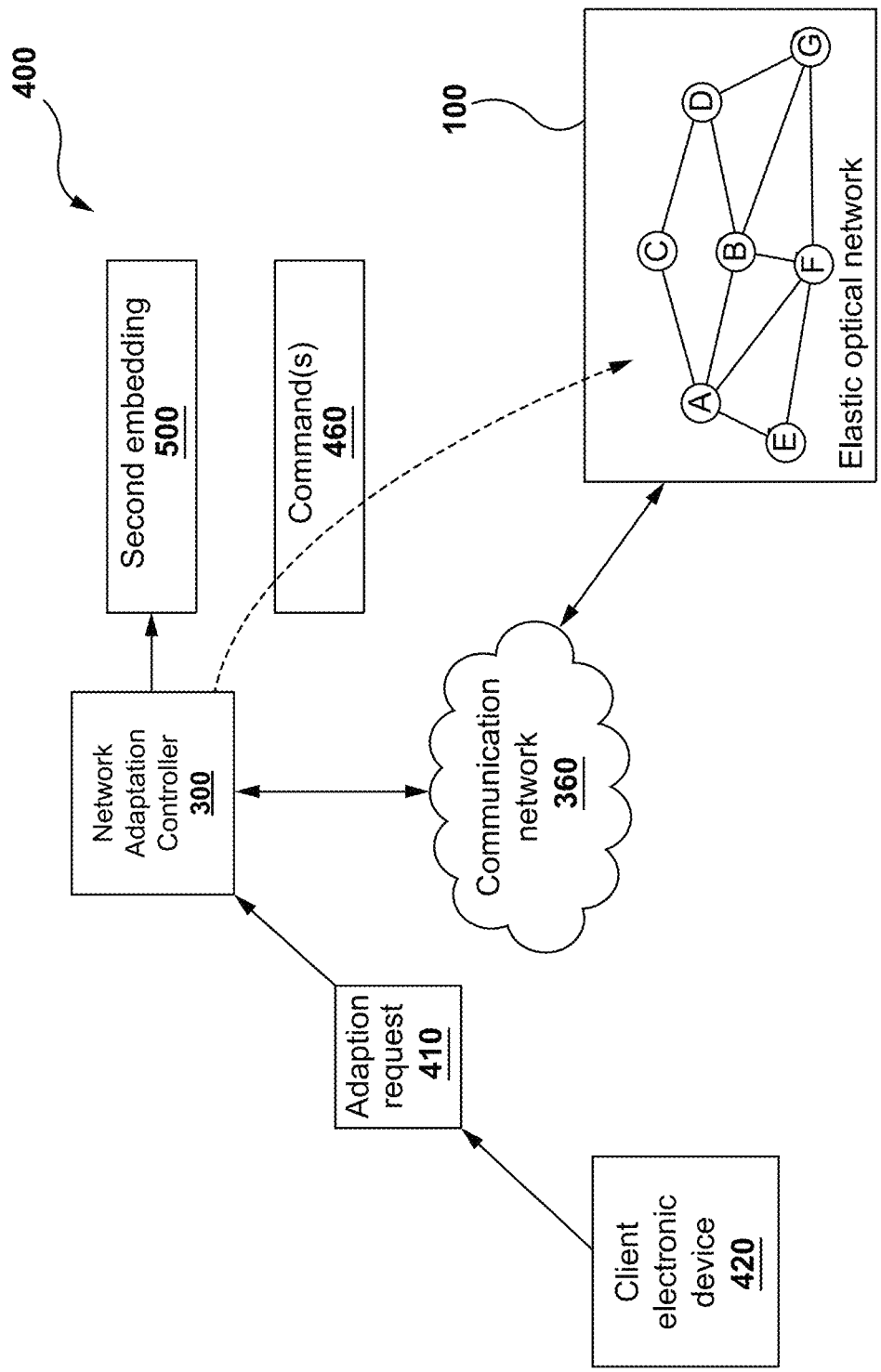
FIG. 4A depicts a high-level functional block diagram illustrating adaptation to an adaptation request received for a virtual link of FIG. 1B, in accordance with various embodiments of present disclosure.

FIG. 4A is a block diagram illustrating a network adaptation controller that can be used to modify the characteristics of a VN, or a VLink within the VN, to accommodate a requested modified data rate on the VLink.

In at least one embodiment, network adaptation controller 300 receives a network adaptation request 410 from a client device 420 associated with the customer associated with the VN 148. An administrative or control entity will embed a virtual network on the substrate network in response to a customer request. The topology of the VN 148 is specified by the customer. A single substrate network can host a plurality of VNs on the same set of underlying resources. As the needs of a VN 148 change, the customer can transmit a request (the adaption request 410) for a modification of the characteristics of the VN. Typically the request is associated with one or more specific VLinks. The adaptation request 410 is a request for modification of the current embedding 200 of the VLink 150 from an existing data rate to a modified data rate. Although the discussion makes specific reference to the adjustment of embeddings to address changes to the data rate, it should be understood that there is no intention to limit the modifications only to data rate. Other parameters of the VLinks can also serve as the basis for modifying the embeddings, such parameters may include latency, jitter and other such link parameters.

In order to satisfy the adaptation request 410, network adaptation controller 300 determines a second embedding 500 of the VLink 150 that satisfies the modified data rate. For example, the current (initial) data rate of the VLink 150 may be 400 Gbps, and the modified data rate may be 500 Gbps. The determined second embedding 500 can then be transmitted to control entities to implement the parameters of the second embedding 500 in place of the initial embedding.

Figure 4B:
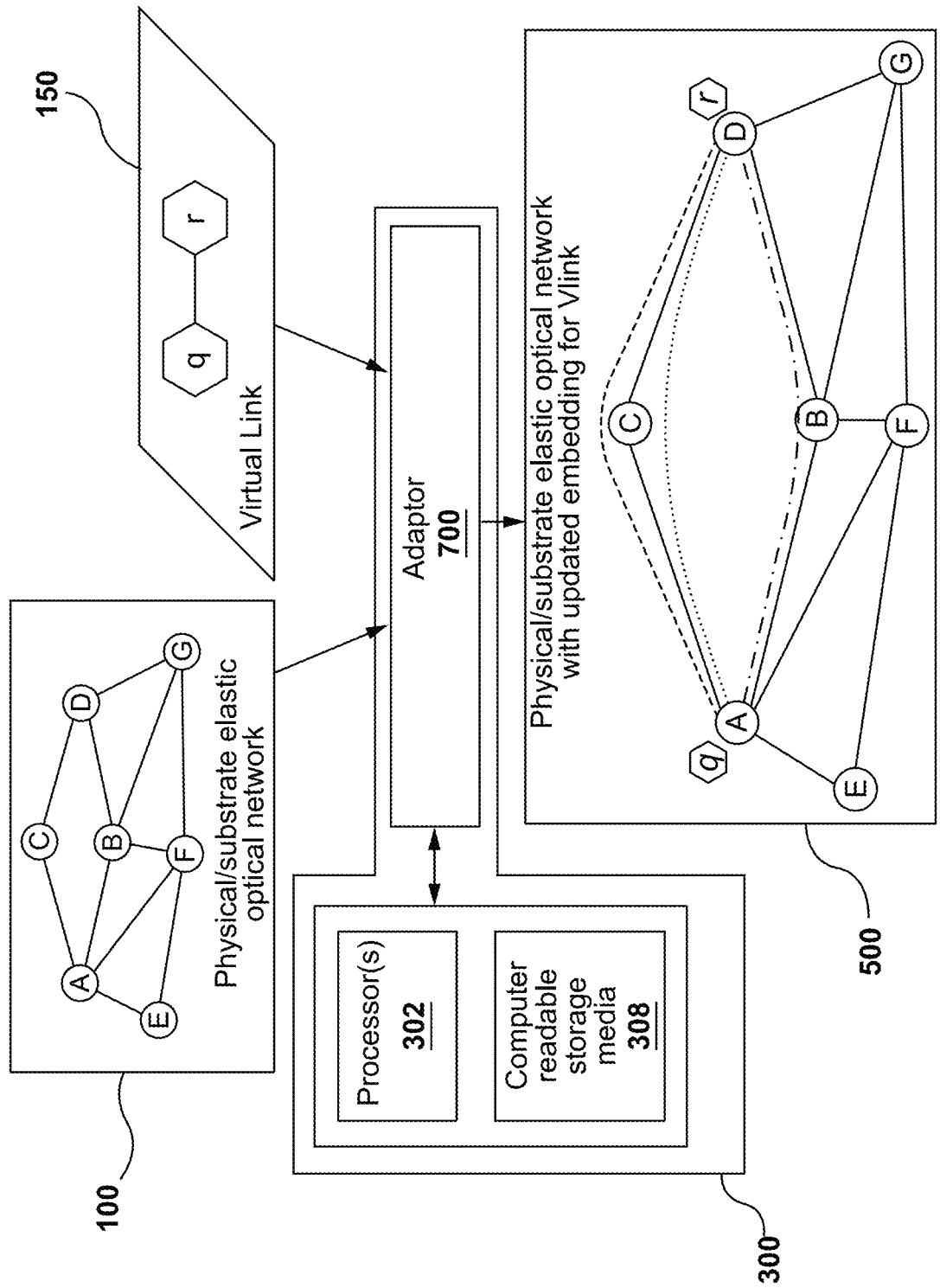
FIG. 4B depicts a high-level functional block diagram of a network controller, in accordance with various embodiments of the present disclosure.

FIG. 4B depicts a high-level functional block diagram of an embodiment of network adaptation controller 300 configured to implement adaptation of embeddings within VNs running atop EON 100 in response to a customer request. As shown in FIG. 4B, network adaptation controller 300 includes a dynamic virtual network adaptor 700 (also referred to herein as "adaptor 700"). Adaptor 700 will be understood to be an example of a logical arrangement of elements created through the execution of software stored in storage media 308 by processor 302. Network adaptation controller 300 receives a customer request for adaption of the parameters of VLink 150. The network adaptation controller 300 uses the knowledge of the topology of EON 100 and the available resources to select a modification to the embedding of virtual link 150. Network adaptation controller 300 then transmits instructions to the adaptor 700 to modify the embedding associated with virtual link 150.

In order to accommodate the modification of the virtual link associated with the adaptation request, the EON operator (also referred to as an infrastructure provider (InP)) needs to identify the available resources that can support the adaptation request. If there are multiple VNs operating atop the EON, there may be a number of different customers, each of which have service level agreements (SLAs) with the operator. The adaptation of the resources allocated to the splits of the VLink need to be done in a manner that is constrained not only by the available resources in the EON, but also in a manner that minimizes (and preferably avoids) any reallocation of resources currently allocated to the other VNs. Reallocation of resources being used by other VNs will likely have a disruptive effect on the traffic carried in the other VNs. In some embodiments, the modification to the VLink resource allocations (reflected in the embedding associated with the VLink) are done so as to maximize the utilization of the existing spectrum to reduce network agitation.

Figure 5A:
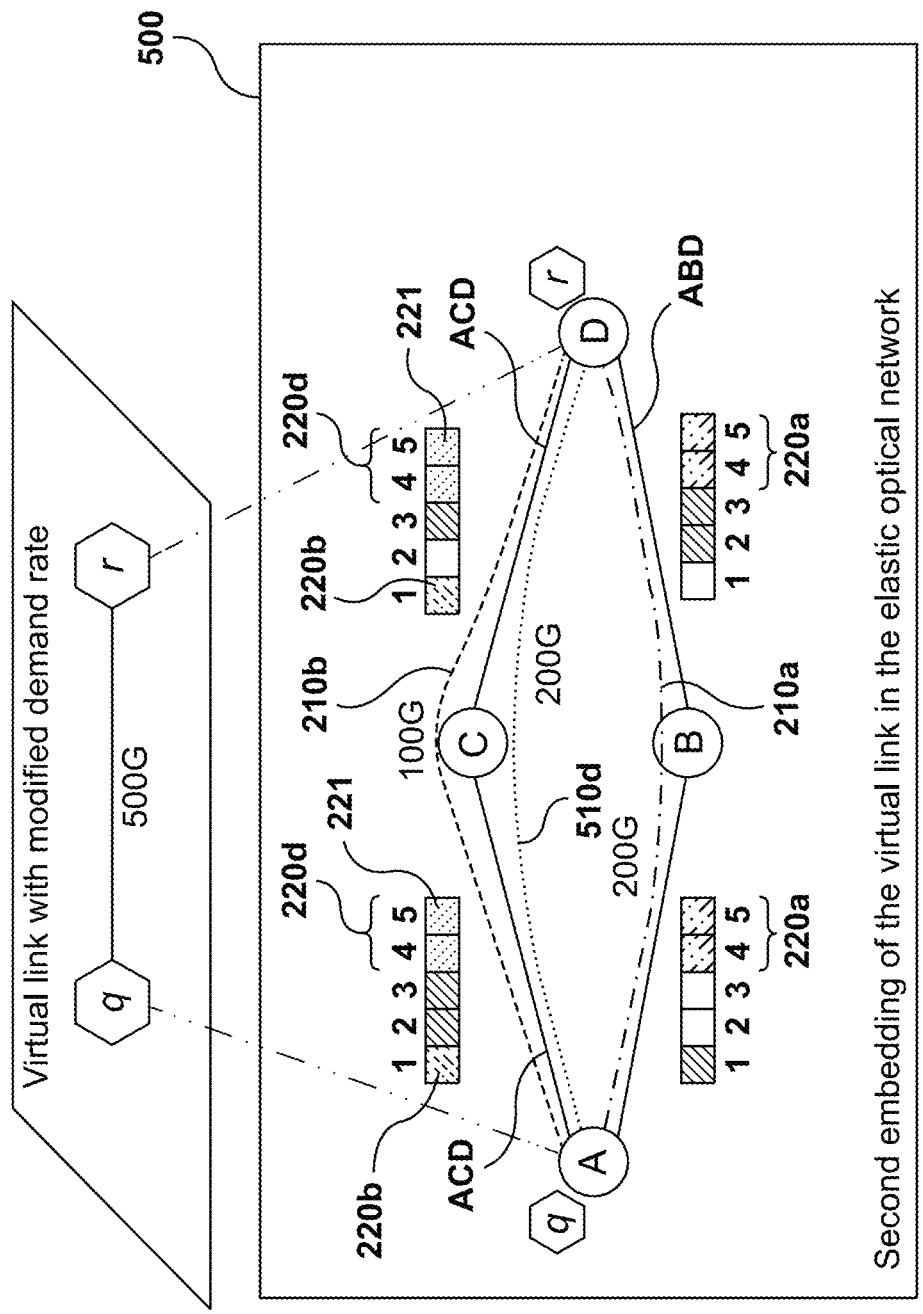
FIG. 5A depicts a non-limiting example of a second embedding of the virtual link of FIG. 1 which satisfies the adaptation request, in accordance with various embodiments of the present disclosure.

FIG. 5A depicts a non-limiting example of a second embedding 500 of VLink 150 onto the resources of EON 100 which satisfies the adaptation request 410. The second embedding 500 of VLink 150 comprises three splits: the first current split 210a, the second current split 210b, and an adapted third split 510d. That is, no changes are made to the first and second splits 210a and 210b. Instead a revision to the characteristics of the third split 510d increases the data rate from 100 Gbps to 200 Gbps to accommodate the request of an increase in the data rate of VLink 150 from 400 Gbps to 500 Gbps.

In this non-limiting example, the adaptation request 410 may be accommodated by changing the modulation format of the third split 210c in FIG. 2 by increasing the data-rate from 100 Gbps to 200 Gbps. In the second embedding 500, no additional transponder is used and no lightpath has been migrated to accommodate the adaptation request 410.

As can be seen in FIG. 5A, the adapted third split 510d occupies one additional frequency slot 221 in physical path ACD. In other words, the third split 210c is expanded to become the adapted third split 510d by adding an additional, previously unoccupied frequency slot 221 that was adjacent to frequency slot 220c in the embedding 200 depicted in FIG. 2. In accordance with the contiguity restriction, the adjacent frequency slots are considered to be a single allocation 220d.

When multiple VNs use the resources of the same substrate network, each will have a SLA. These SLAs often define acceptable levels of disruptions of service. In general, it is considered preferable to avoid causing disruption to other VNs when modifying the embeddings of a first VN. Disruptions may be tolerated in some circumstances, but typically the adaptions should avoid impairing real time data traffic handling in other VNs (e.g. best effort traffic is better to disrupt than real time traffic). From the perspective of the operator of the substrate network, it is also preferable to avoid increasing operational costs where possible. Movement of the existing traffic on a VLink to a new physical path will result in network agitation, but can be avoided using the above factors. These factors can be considered as constraints in a modelling problem when determining how to accommodate an adaption request. The constraints may be phrased as (i) minimizing disruption to existing traffic (in the VN in question, and in other VNs) and (ii) minimizing the use of additional transponders and/or spectrum resources FIG. 5B depicts a portion 580 of a spectral bandwidth of one physical path (e.g. physical path ACD of FIG. 2), in accordance with various embodiments of the present disclosure.

The whole spectral bandwidth of each physical path of EON 100 may be divided into frequency slots 220b, 220c, 221, 222. Such equal-width frequency slots is referred to as a frequency slot set S and enumerated as 1, 2, . . . |S|.

Figure 5B:
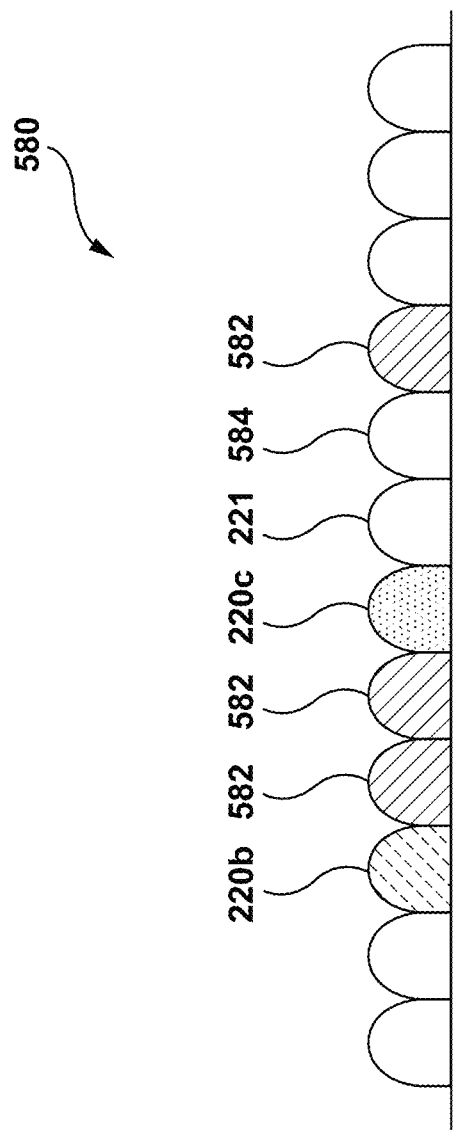
FIG. 5B depicts a portion of a spectral bandwidth of one physical path, in accordance with various embodiments of the present disclosure

For example, the spectral bandwidth of the physical path, portion 580 of which is depicted in FIG. 5B, may be divided in 160 frequency slots, each slot having a frequency slot bandwidth of 25 GHz.

The methods and systems as described herein are based on an assumption that each optical link has a finite number of fibers in each direction. Moreover, the optical nodes may be Colorless-Directionless-Contentionless (CDC). As known in the art, colorless optical nodes enable any wavelength to be added/dropped at any port. Directionless optical nodes can remotely route wavelengths across any viable path in the network. Contentionless optical nodes eliminate or reduce wavelength blocking, so that operators can add or drop the same wavelength at the same add/drop structure.

In FIG. 2, current frequency slot 220c is allocated to the third current split 210c of the current embedding 200. In FIG. 5B, slots 582 that are allocated to VNs other than the current one are also depicted. In FIG. 5B slots allocated to VN 148, and other VNs are shown. In FIG. 2, Frequency Slot 221 is shown as unallocated. This unallocated slot can be assigned to VLink 150 in embedding 500 to accommodate request 410. The unoccupied slot 221 is adjacent to the current frequency slot 220c of the third current split 210c and thus satisfies both the contiguity constraints, which avoids the creation of a new split, and the continuity constraints which avoids having an intermediate node process and switch signals.

In at least one embodiment, modulation formats supported by the substrate network may range from BPSK to 64 QAM. In at least one embodiment, and FEC overhead may range from 7% and 50%. Selection of different modulation formats and FEC overheads in the configuration parameters may lead to different physical reaches for different transmission configurations.

In some embodiments, the methods and systems described herein may use a make-before-break (MBB) technique. When using an MBB technique, a lightpath may be brought up and configured for a new split before migrating traffic from an existing split to the new split. Such a technique may result in an increased resource use during a transitional period of time. Use of MBB may result the minimal possible disruption to traffic on one or more splits that are migrated in order to adapt to adaptation request.

The methods and systems disclosed herein may help to minimize disruption caused by different possible re-configuration techniques in response to the received adaptation request 410. The methods take into account different levels of disruptions of the transport networks caused by different types of re-configuration actions. As discussed below, appropriate costs may be assigned to various actions.

It should be understood that the costs that may be assigned to various actions may be monetary as well as non-monetary values. For example, dissatisfaction of the customers may be quantified by various values attributed to various actions and used in determining the cost of generating and mapping a new embedding to the EON 100 in response to the adaptation request.

In at least one embodiment, the adaptor 700 is configured to find a minimized cost in terms of (i) number of additional transponders, (ii) additional spectrum occupation, and (iii) disruption to existing traffic. A minimized cost may be the lowest cost, or it may be a cost that is below a threshold defined to represent an acceptable cost. The adaptation request will be mapped into a set of candidate embeddings, each of which will be evaluated in accordance with their cost metric. A candidate embedding will be selected in accordance with the cost metric, and will be implemented. The implementation of the candidate embedding can typically be performed sufficiently quickly to allow for a reduced disruption to the traffic (e.g. reduced so that it is within an acceptable limit) and without affecting the connectivity or traffic of other (co-existing) virtual networks on the same EON 100 (again within acceptable limits, which may be defined in the SLAs associated with the other VNs).

Figure 6A:
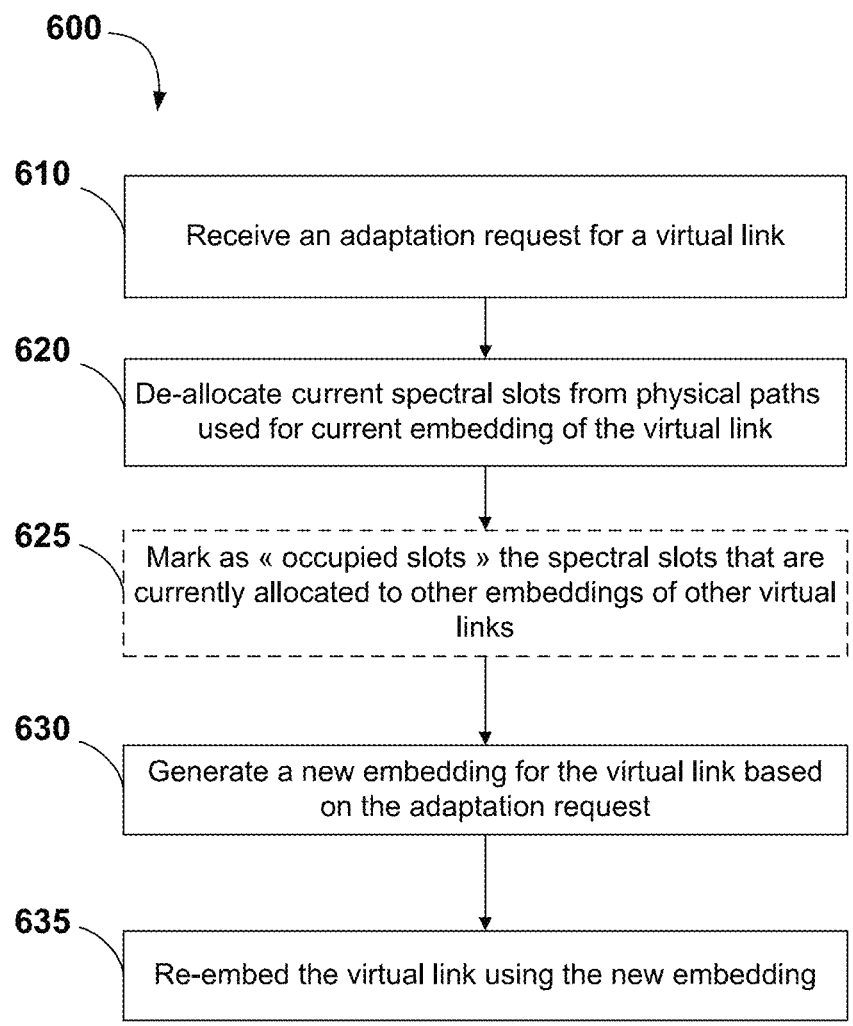
FIG. 6A depicts a flowchart of a method for adaptation of EON based on an adaptation request, in accordance with various embodiments of the present disclosure.

FIG. 6A is a flowchart illustrating a method 600 for adaptation of VLink 150 to a modified data rate, in accordance with various embodiments of the present disclosure. Method 600 may be carried out by a network controller, a resource allocation controller or any other such device. In the context of the earlier discussions it may be carried out by network adaptation controller 300.

At step 610, an adaptation request, such as adaption request 410, is received. The adaptation request 410 may comprise the identifiers of end nodes of the VLink 150 or any other identifiers that may help to identify that a particular VLink 150 needs to be adapted. The adaptation request includes a request for a modified link characteristic, which in this illustrated embodiment is a modified data rate for VLink 150. The topology of the substrate network, and the available resources and existing resource allocations may be available to the node or function carrying out the method in any of a number of different ways that are not germane to the present discussion. If the modified data rate is lower than the current data rate associated with VLink 150, the removal of resources associated with VLink 150 is performed with the objective of consolidating unallocated resources as much as possible. If The following discussion will deal with the alternate embodiment where the modified data rate is higher than a current data rate of the VLink 150.

At step 620, the current spectral frequency slots (e.g. first, second, and third slots 210*a*, 210*b*, 210*c*) on physical paths (e.g. physical paths ABD, ACD) used for the current embedding of the VLink 150 are identified, and are, solely for the purposes of the modelling, subsequently released. In a first embodiment, this set of released resources (e.g. released slots) are combined with a controller accessible set of available resources reflective of the substrate resources not currently assigned to any VN. This results in a pool of resources is a combination of the resources that are not assigned to a VN and the resources that are currently assigned to VLink 150.

If network controller receives a list of all substrate network resources not allocated to links within VN 148, the addition of the resources associated with VLink 150 will result in a pool of resources that is reflective of the resources not currently associated with VN 148. In such a case, at step 625, spectral frequency slots that are currently allocated to other embeddings of other VLinks are marked as "occupied slots". The other VLinks may be any VLinks that are mapped to the EON 100, including those that are part of the same VN and those from different VNs. This results in a set of resources that reflects a combination of the resources are not currently allocated and those associated with VLink 150.

At step 630, a new embedding satisfying the modified data rate of the adaptation request, and which satisfies optional optimization objectives, is generated.

The optimization objectives may be, for example: minimizing number of new transponders, and minimizing number of new splits and/or new frequency slots. In addition, minimizing service disruption such that each existing split is assigned one of adaptation actions.

At step 635, VLink 150 is re-embedded in the substrate network using the newly generated embedding. If a single entity is carrying out the above steps, step 635 may be accomplished either through direct control of the embedding, or through transmission of an instruction to a controller associated with the resources used by Vlink 150.

To ensure operation efficiency, reducing the disruption associated with the re-embedding of VLink 150 is important. If an exhaustive set of embeddings is generated, then in step 630, a cost metric can be determined for each embedding. The disruption can be mitigated through the selection of an appropriate embedding. In at least one embodiment, a disruption cost model can be employed in either one or both of the generation of candidate embeddings and the selection of the embedding to be applied. The disruption cost model assesses a cost for the disruptions associated with various adaptation actions. Different adaptation actions may cause different levels of disruptions to existing traffic and may need different amounts of resources, such as transponders, frequency slots, etc. For example, allocating an adjacent frequency slot for a split would have an associated cost, while embedding the VLink on an entirely different physical link could have a greater cost. Taking resources from a different VLink in the same VN, causing a required adjustment to the embedding of the different VLink (which may result in a cascade of different re-embeddings) would have a cost, while taking resources associated with VLinks in other VNs may be assigned a prohibitively high cost to discourage causing disruption for other substrate network customers.

In some embodiments, one or more candidate embeddings that may satisfy the modified data rate are identified. For each candidate embedding, a disruption cost, a transponder cost and a frequency slot allocation cost can be determined and assigned, as described below. Such costs are determined by assigning to each adaptation action (or a combination of each adaptation actions) a cost, based on the modifications needed to the physical path, the transmission configuration and to the frequency slot combination in order to satisfy the modified data rate. Using the disruption cost model, a cost metric can be associated with each generated candidate, so that the selected embedding can have a sufficiently low disruptive result in the EON.

In at least one embodiment, the new embedding needs to satisfy one or more allocation constraints. Such allocation constraints may comprise, for example, a maximum number of splits in the new embedding, as well as the spectrum contiguity constraints and the spectrum continuity constraints discussed above.

In carrying out this method, different sets of information may be required. In some embodiments, some of the information may be included in the received adaptation request. In other embodiments, some of the information may be pre-determined by an administrator and stored so that they are accessible to a network controller carrying out these methods. Some input parameters may be stored, for example, in one or more databases 350 of the computer-readable storage media 308.

Among the input parameters, may be a topology of the substrate network, denoted as EON G 100 (that may also be referred as a "substrate EON" or EON G), and topology of the VN associated with the VLink to be modified. This VN topology is denoted as virtual network $\overline{G}$ 200. Another input is the Vlink 150, denoted as virtual link $\overline{e}$ 150 of $\overline{G}$. The virtual link e 150 satisfies an initial (current) data rate $b_{\overline{e}}$. Using the methods described herein, the virtual link e is adapted to accommodate a modified data rate $b_{\overline{e}}'$.

For each transmission configuration, there is a transmission configuration tuple t=(d, b, m, f) reflecting the different transmission configuration parameters. Each transmission configuration tuple comprises values for transmission configuration elements such as a data-rate d, a baud rate b, a modulation format m, and a FEC overhead f.

The system may also receive, as an input, a set of k shortest substrate paths (SPaths) $P_{\overline{e}}^k$ to support the embedding of virtual link $\overline{e}$ 150. The system may also receive, as an input, a set of feasible transmission configurations $T_{\overline{e}_p}$ on a physical path p for the virtual link $\overline{e}$ 150. Each physical path p may have its own set of transmission configurations $T_{\overline{e}_p}$ that will allow the specific physical path to provide the required VLink characteristics.

In at least one embodiment, a VLink may be embedded in EON 100 by splitting its demand across multiple substrate network paths (SPaths). For example, a maximum number of splits that a VLink embedding may have may be restricted to a pre-defined number. The maximum number of splits is denoted herein by "q".

A constraint that ensures that the sum of data-rates resulting from applying the selected transmission configuration on the selected splits is equal or larger than the VLink's requested higher data rate may be expressed as follows:

$$b'_{\bar{e}} \leq \sum_{\forall p \in \mathcal{P}^k_{\bar{e}}} \sum_{\forall t \in \mathcal{T}_{\bar{e}p}} \sum_{i=1}^{q} (w_{\bar{e}pti} \times t^{(d)}). \quad (1)$$

In expression (1), $w_{\bar{e}pti}$ is a tuple decision variable which indicates if virtual link e will use an i-th instance of tuple 't' on path 'p' in the new embedding. The tuple decision variable $w_{\bar{e}pti}$ may be, for example, a binary value. $T^{(d)}$ is the transmission configuration that satisfies data rate 'd'.

With a maximum of 'q' splits, the following expression may ensure that the number of splits of the new embedding is less than an upper limit of the splits:

$$\sum_{\forall p \in \mathcal{P}^k_{\bar{e}}} \sum_{\forall t \in \mathcal{T}_{\bar{e}p}} \sum_{i=1}^{q} w_{\bar{e}pti} \leq q. \quad (2)$$

If a path p is selected with a specific transmission configuration, i.e., tuple t=(d, b, m, f), then the following expression may help to ensure that the number of frequency slots that may support the modified data rate are allocated on the physical path p.

$$\forall p \in \mathcal{P}^k_{\bar{e}}, \forall t \in \mathcal{T}_{\bar{e}p}, 1 \leq i \leq q : \sum_{\forall s \in S} y_{\bar{e}ptis} = n_t \times w_{\bar{e}pti} \quad (3)$$

In expression (3), $y_{\bar{e}ptis}$ is a frequency slot decision variable which indicates whether the virtual link e will use a frequency slots on a path p with the i-th instance of tuple t in the new embedding. The frequency slot variable $y_{\bar{e}ptis}$ may be, for example, a binary value.

The following expression provides a so-called "spectrum exclusiveness" constraint:

$$\forall e \in E, \forall s \in S : \sum_{\forall \bar{e} \in E} \sum_{\forall p \in \mathcal{P}^k_{\bar{e}}} \sum_{\forall t \in \mathcal{T}_{\bar{e}p}} \sum_{i=1}^{q} w_{\bar{e}pti} \times y_{\bar{e}ptis} \times \delta_{pe} \leq 1 \quad (4)$$

The spectrum exclusiveness constraint of expression (4) ensures that each frequency slot is allocated to at most one physical path. In expression (4), $\delta_{pe}$ is a binary variable that is set to 1 to ensure that each frequency slot on physical link e is allocated to at most one path p.

The following expression can be to ensure that the frequency slots allocated on each SLink of a path are contiguous.

$$\forall p \in P^k_{\bar{e}}, \forall t \in T_{\bar{e}p}, 1 \leq i \leq q, \quad (5)$$
$$1 \leq s \leq |S| - 1 : \sum_{s'=s+2}^{|S|} y_{\bar{e}ptis'} \leq |S| \times (1 - y_{\bar{e}ptis} + y_{\bar{e}pti(s+1)}).$$

Equation (5), if used and respected, ensures that frequency slots on intermediate links of the substrate path (also referred to herein "physical path") are adjacent to each other in the frequency spectrum in all consecutive links.

As noted above, mapping of different candidate second embeddings 500 of the VLink 150 to the substrate network 100 may cause various levels of disruption to the current traffic in the substrate network 100. For example, in some cases, a candidate second embedding may require that new transponders be added (powered on or used). In some embodiments, in order to accommodate the adaptation request 410 using a given candidate embedding, the frequency slot(s) of one or more physical paths may need to be re-assigned or modified as described below.

For each adaptation request 410, a plurality of candidate embeddings is generated. Each candidate embedding satisfies the adaptation request 410.

Figure 7:
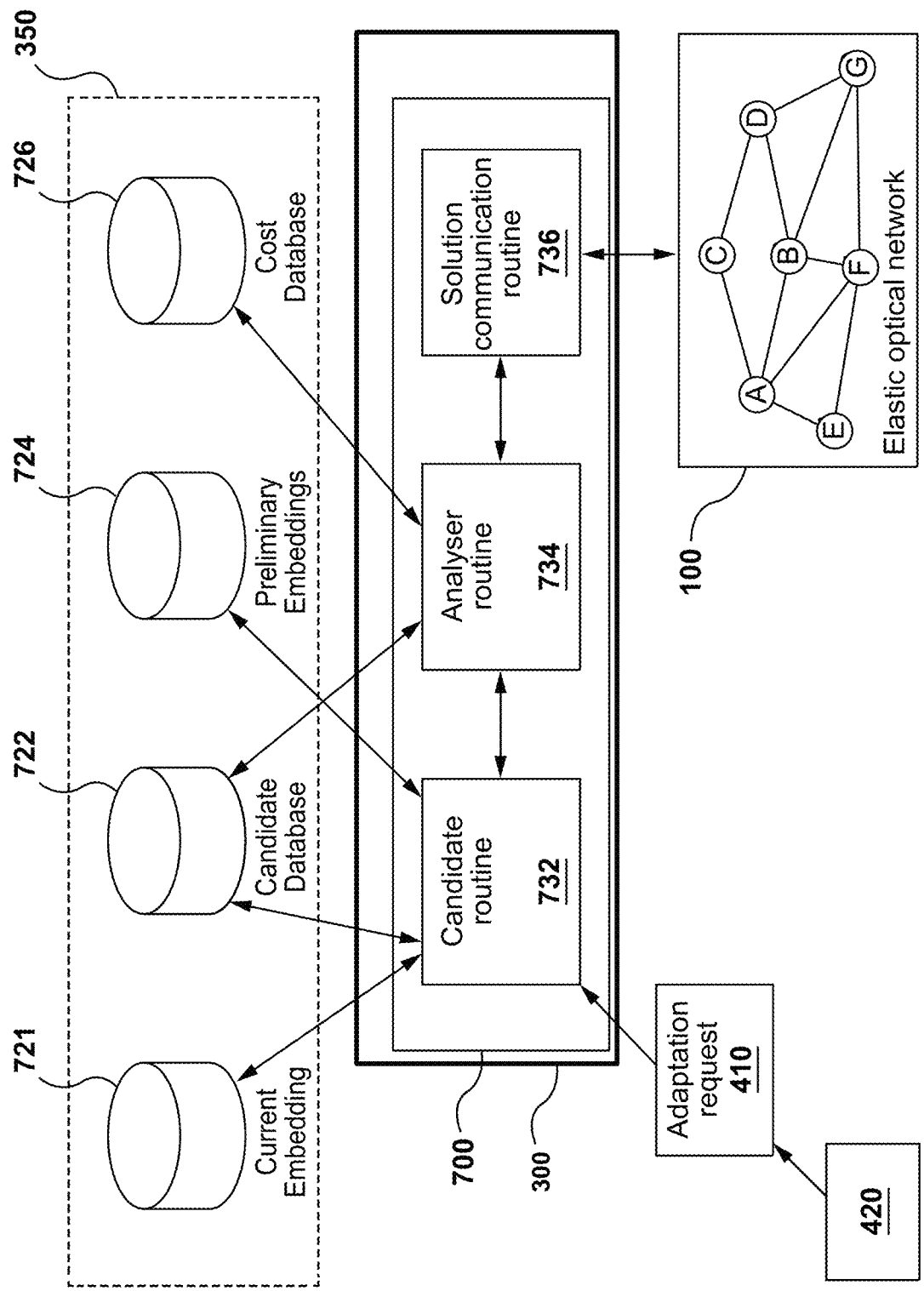
FIG. 7 depicts a schematic illustration of an adaptor and its communication with the client electronic device, databases, and the optical network, in accordance with various embodiments of the present disclosure.

FIG. 7 depicts a schematic illustration of an adaptor 700 and its communication with, databases 721, 722, 724, 726, and the physical optical network 100, in accordance with non-limiting embodiments of the present disclosure.

The adaptor can be implemented using a computing platform having a memory and processor along with a network interface as described above. The adaptor 700 can carry out the method described above through the execution of a candidate generation routine 732, a candidate analyser routine 734, and a solution communication routine 736.

In the context of the present specification, the term "routine" refers to a subset of the computer executable program instructions of the adaptor 700 that is executable by the processor 302 to perform the functions explained below in association with the various routines. For the avoidance of any doubt, it should be expressly understood that the "routines" are illustrated schematically herein as separate entities for ease of explanation of the processes executed by the adaptor 700. It is contemplated that some or all of the routines described herein may be implemented as one or more combined routines. Similarly, each routine may be implemented on a different hardware platform than the other routines.

The candidate routine 732 receives the adaptation request 410 specifying a request to modify the operational parameters of VLink 150, and accesses a current embedding database 721. The current embedding database 721 stores data related to the current embedding 200 of VLink 150. In some embodiments, in place of current embedding database 721, these details can be made available through another resource, or can be specified in the received adaptation request 410 itself.

The data related to the current embedding 200 of VLink 150 may comprise, for example, the tuple t, comprising a data rate, a baud rate, a modulation format and a FEC overhead of one current transmission configuration of one split located on one physical path p. In other terms, tuple t describes some of the operational parameters of one split. One split may have (comprise, correspond to) one or more frequency slots s that have the same transmission configuration and are contiguous.

For example, a 400 Gbps transmission may be provisioned using QPSK modulation, an FEC overhead of 25% and three frequency slots of 25 GHz each (for a total of 75 GHz). In other terms, in such example, one split may correspond to 75 GHz frequency bandwidth and the tuple t contains the parameters associated with the split.

The candidate generation routine 732 generates a plurality of candidate embeddings to satisfy the adaptation request 410. The generated candidate embeddings are then transmitted to and stored in a candidate database 722. In at least one embodiment the candidate embeddings may be generated using a brute force approach that considers all possible combinations of the tuple parameters that satisfy the link distance on all available splits subject to a maximum of q splits for a VLink. As the Analyser routine will use the results of candidate generation routine 732, in some embodiments the candidate embeddings are transmitted directed to the analyser routing 734.

In at least one embodiment, the analyser routine 734 determines a total cost for each candidate embedding. As described below, the analyser routine 734 may also select a new embedding which has the smallest total cost of all candidate embeddings of the candidate database 722, or may identify the embeddings with a sufficiently low cost (e.g. costs below a specified threshold). The selected embedding can then be transmitted to the solution communication routine The solution communication routine 736 receives the selected embedding, and transmits instructions to network controllers within EON 100 to implement the new embedding. The instructions may be provided to a single entity within EON 100, or, if adaptor 700 is already within the control or management plane of EON 100, it may transmit instructions to implement the new embedding directly to elements in EON 100 associated with the new embedding.

In at least one embodiment, the analyzer routine 734 determines a disruption cost $Cost_e^{ds}$ for each candidate embedding. For this, the analysing routine maps a disruption cost coefficient $c(\overline{eptis})$ to each candidate split of the candidate embedding. The value of the disruption cost coefficient $c(\overline{eptis})$ is based on an adaptation action or a combination of the adaptation actions that need to be executed in order to implement such candidate embedding.

In one embodiment, the embedding of candidate splits are associated with adaptation actions that are classified as one of six adaptation action types. These adaptation action types are discussed below.

A candidate split implemented using a first adaptation action type $R_1$ (also referred to herein as "$R_1$-type candidate split") reuses the physical path, allocated frequency slot, and transmission configuration of the allocated current split. Such adaptation action causes no disruption. Also, no additional transponders need to be deployed, and no additional frequency slots need to be used for a candidate split of the first adaptation action type $R_1$. In other words, the candidate frequency slot s' of $R_1$-type candidate split is the same as the current frequency slot s used by the current split of the current embedding. In an $R_1$-type candidate split, the splits of the candidate (along with the candidate tuple) are the same splits, with the same parameters, as the current split. For $R_1$-type candidate split, the disruption cost coefficient $c(\overline{eptis})$ can be defined to be zero.

A candidate split implemented using a second adaptation action type $R_2$ (also referred to herein as "$R_2$-type candidate split") reuses the current frequency slot(s) of the allocated current split but modifies a transmission configuration. To modify the transmission configuration, one or more of the transmission configuration parameters of the tuple t are modified. In other words, while the physical path of the split and the frequency slots remain the same as the current embedding, the configuration tuple t is changed to a candidate tuple t'. At least one element of one transmission configuration tuple of the candidate split different from a respective element of the transmission configuration tuple of the respective current split.

The $R_2$-type candidate split does not need to use additional transponders or additional frequency slots. The $R_2$-type candidate split may cause a disruption to the traffic of the EON 100. The disruption cost coefficient $c(\overline{eptis})$ of the $R_2$-type candidate split may be described by a first cost constant $c_1 \gg 0$. For the $R_2$-type candidate split, the disruption cost coefficient $c(\overline{eptis})$ may be defined as the first cost constant $c_1$: $c(\overline{eptis})=c_1 \gg 0$.

A candidate split implemented using a third adaptation action type $R_3$ (also referred to herein as "$R_3$-type candidate split") is implemented by assigning a new set of frequency slots to the split. There is no overlap in the new set of frequency slots and the current set of frequency slots nor do they overlap with frequency slots assigned to other VLinks whether in the same or a different VN. This allows for the new split to be brought online before the existing split is torn down, which enables a make before break transition. Implementation of an $R_3$-type candidate split may involve the use of additional transponders and/or additional frequency slots. The disruption cost coefficient $c(\overline{eptis})$ of the candidate embedding of $R_3$ type may be described by a second cost constant $c_2 \gg c_1$. For the $R_3$-type candidate split, the disruption cost coefficient $c(\overline{eptis})$ may be defined as $c(\overline{eptis})=c_2 \gg c_1$.

A candidate split implemented using a fourth adaptation action type $R_4$ (also referred to herein as "$R_4$-type candidate split") expands the spectrum that is allocated to the existing current split. The candidate frequency slot, s', of the candidate split may be a combination of the current frequency slot s and an adjacent frequency slot s" that is located on the same physical path p, and is currently unallocated to any virtual link. For example, in FIG. 2 current frequency slot 221 is an unallocated frequency slot. The spectrum of split 210c that is currently allocated to frequency slot 220c may be expanded to frequency slot 221 in order to implement the $R_4$-type candidate split in EON 100 in FIG. 2.

The $R_4$-type candidate split is located on the same physical path as the current split and does not need to use additional transponders. However, the re-use of the already allocated frequency slots may prevent a make before break transition. A cost of disruption caused by implementing $R_4$-type candidate split in EON 100 is higher than the cost of disruption of implementing $R_3$-type candidate split. The disruption cost coefficient $c(\overline{eptis})$ of the candidate embedding of $R_4$ type may be described by a third cost constant $c_3 \gg c_2$. For the $R_4$-type candidate split, the disruption cost coefficient $c(\overline{eptis})$ may be defined as: $c(\overline{eptis})=c_3 \gg c_2$.

A candidate split of a fifth adaptation action type $R_5$ (also referred to herein as "$R_5$-type candidate split") may be obtained by changing the modulation used on an existing split. In addition to the change of modulation, the spectrum assigned to the split may be contracted. In other terms, in order to implement the $R_5$-type candidate split, the spectral bandwidth allocated to the current split is reduced without changing the physical path used by the current split, and the modulation used to encode data is changed.

The $R_5$-type candidate split does not need to use additional transponders or additional frequency slots, but cannot necessarily support a make before break transition. However, a level of disruption, and therefore the cost of disruption, caused by implementing $R_5$-type candidate split is higher than the level of disruption and the cost of disruption of implementing $R_3$-type candidate split. The disruption cost coefficient $c(\overline{eptis})$ of the candidate embedding of $R_5$ type may be described by the third cost constant $c_3$. For the $R_5$-type candidate split, the disruption cost coefficient $c(\overline{eptis})$ may be defined as $c(\overline{eptis})=c_3 \gg c_2$. In some embodiments, the disruption cost constant for $R_5$-type candidate split may be different (for example, insignificantly different) from the disruption cost constant for $R_4$-type candidate split.

A candidate split of a sixth adaptation action type $R_6$ (also referred to herein as "$R_6$-type candidate split") creates a new split with a plurality of contiguous slots with a spectral allocation that overlaps the spectrum of the existing current split. The new frequency slot s' may be in use by current split(s) of the current embedding $\bar{e}$ on a new path p' where the new path p' and the current path p have a common physical link. A candidate embedding generated with the sixth adaptation action type $R_6$ may need to use additional transponders and/or additional frequency slots.

Due to the re-use of existing frequency slots, despite the requirement for new transponders, the level of disruption caused by $R_6$-type candidate split is high. The disruption cost coefficient c($\bar{e}$ptis) of the $R_6$-type candidate split may be described by a fourth cost constant $c_4 \gg c_3$. The disruption cost coefficient for the $R_6$-type candidate split is c($\bar{e}$ptis)$c_4 \gg c_3$.

The disruption cost coefficient c($\bar{e}$ptis) that may be assigned to each adaptation action type thus depends on a particular combination of candidate split's allocation on a physical path, the frequency slot, and transmission configuration used in the candidate split(s) for the adaptation of the VLink based on the adaptation request. If the frequency slots assigned to a split are distinct from those currently assigned, it is possible to establish a make before break transition. If the frequency slots are the same, and modulation is changing, a make before break transition may not be possible. Without a make before break transition, the disruption cost is higher because of the traffic disruption caused during the transition.

It should be noted that the value of the disruption cost coefficient, and/or the values of the first, second, third, and/or fourth constants may be pre-determined based on the technology and the objective of the application.

Among the adaptation actions, the first type adaptation action $R_1$ is preferable because it does not require any additional resource and does not disrupt traffic. The cost of the first type action $R_1$ is zero. However, first type action $R_1$ alone may not support the increased demand, necessitating further adaptation actions.

Second type adaptation action $R_2$ does not need extra resources, but causes a non-negligible disruption due to a transponder reconfiguration. For example, the modulation change may take approximately several tens of seconds.

Although the third type adaptation actions $R_3$ create new lightpaths to reallocate a set of spectrum slots of the split or to add a new split, they incur moderate disruptions. A new lightpath with the spectrum that does not overlap with any existing lightpath may be generated using the MBB technique.

It should be noted that the adaptation actions of the first and second types $R_1$, $R_2$, and $R_3$ may use the MBB technique described above.

MBB is not suitable for the adaptation actions $R_4$, $R_5$, $R_6$. In order to implement actions $R_4$, $R_5$, $R_6$, optical network elements on intermediate nodes of an existing split may need to be changed.

In order to implement the fourth- and fifth-type adaptation actions $R_4$ and $R_5$ there may be more than one combination of one or more frequency slots, a transmission configuration, and a physical path where the frequency slots are allocated. The fourth- and fifth-type adaptation actions $R_4$ and $R_5$ may require examining more than one frequency slots in order to determine if $R_4$ and $R_5$ may apply.

Referring again to FIG. 5A, the second embedding 500 of VLink 150 satisfies an adaptation request 410 to increase the data rate to 500 Gbps. In the second embedding 500, the adaptation request 410 is satisfied by an adapted third split 510d. The adapted third split 510d is generated from the third current split 210c (depicted in FIG. 2) by increasing the data rate of the third current split 210c from 100 Gbps to 200 Gbps. To do so, a spectrum allocation of the third current split 210c is expanded to add frequency slot 221 to already allocated frequency slot 220c. Such adaptation action is a fourth-type adaptation action $R_4$, and such adaptation action disrupts the traffic of the current third split 220c.

Figure 8A:
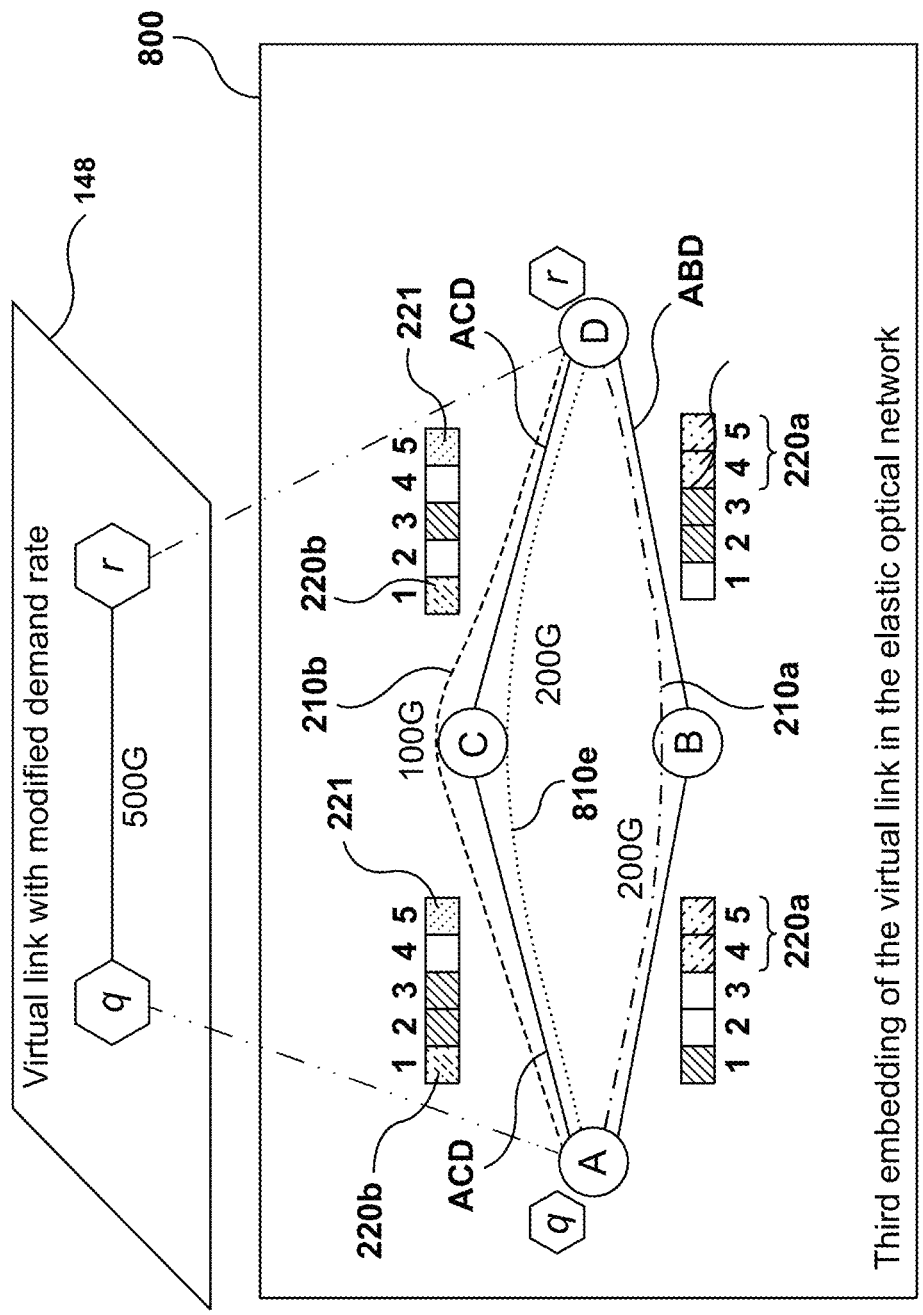
FIG. 8A depicts a third embedding that would satisfy the adaptation request and that would cause less disruption to the traffic of the PN compared to the second embedding of FIG. 5A, in accordance with various embodiments of the present disclosure.

FIG. 8A depicts a third embedding 800 that would satisfy the adaptation request 410 and that would cause less disruption to the traffic of the network 100 compared to the second embedding 500. An alternative adapted third split 810e may be generated on the physical path ACD using a third-type adaptation action $R_3$. The alternative adapted third split 810e can provide 200 Gbps data rate in the frequency slot 221. Such third embedding 800 is a less-disruptive embedding than the second embedding 500 if the MBB technique is used in the implementation of the third embedding 800.

In the third embedding 800, the frequency slot 220c is no longer used, while the alternative adapted third split 810e uses slot 221. Thus, the third embedding 800 uses less number of frequency slots than the second embedding 500. The frequency slot allocation cost of the third embedding 800 is therefore less than the frequency slot allocation cost of the second embedding 500.

The alternative adapted third split 810e in FIG. 8A is referred to herein as the alternative adapted third split 810e to distinguish from the adapted third split 510d, because the alternative adapted third split 810e uses a different frequency slot 221 than the adapted third split 510d in the second embedding 500 FIG. 5A. It should be mentioned that the third embedding 800 depicted in FIG. 8A has three splits: the first split 210a, the second split 210b, and the alternative adapted third split 810e.

Figure 8B:
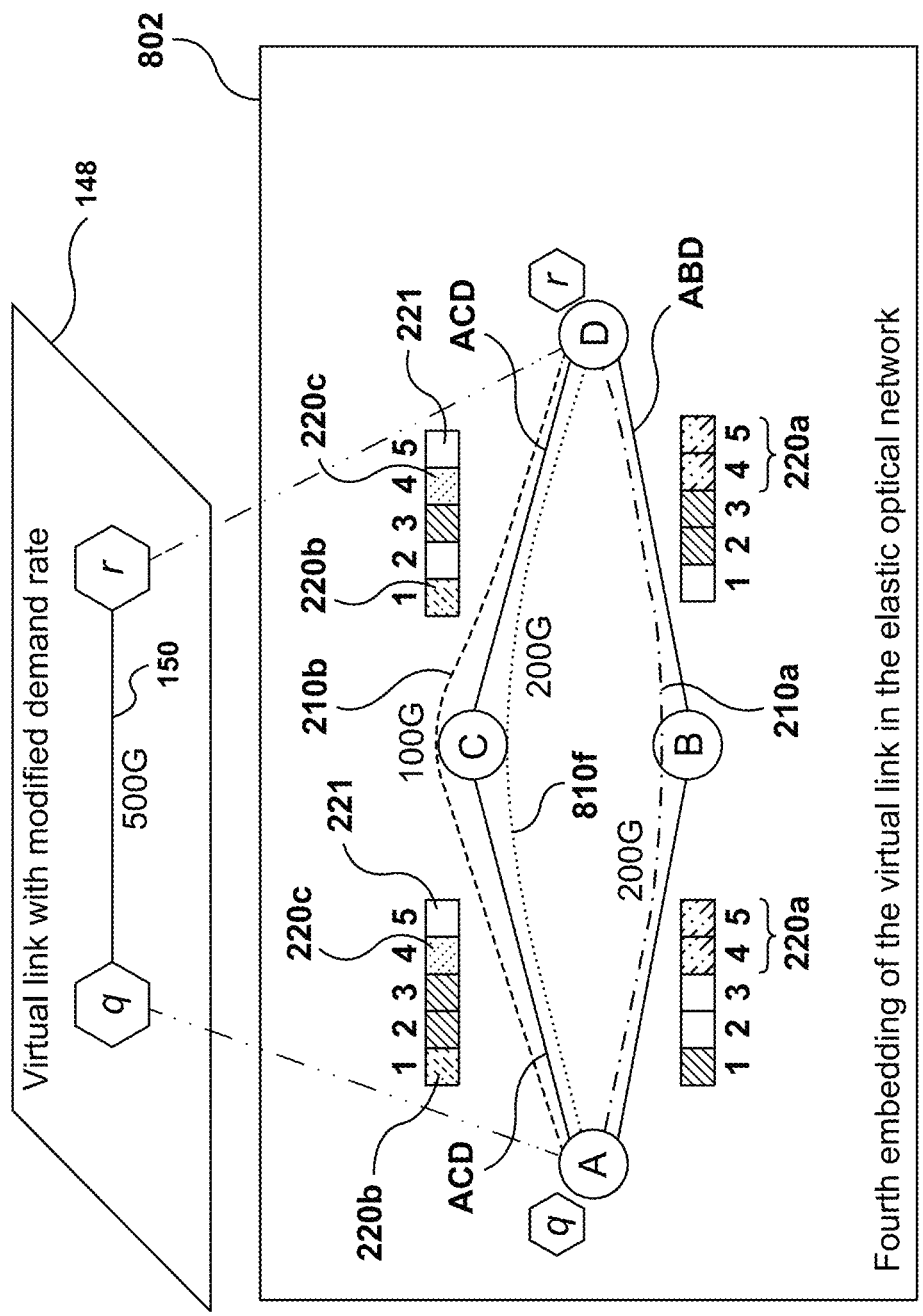
FIG. 8B depicts a fourth embedding that would satisfy the adaptation request and that would cause less disruption to the traffic compared to the third embedding of FIG. 8A, in accordance with various embodiments of the present disclosure.

FIG. 8B depicts a fourth embedding 802, in accordance with various embodiments of the present disclosure. The fourth embedding 802 would cause, when implemented to adapt to the modified data rate, even less disruption to the traffic compared to the third embedding 800. The fourth embedding 802 depicted in FIG. 8B has three splits: first split 210a, second split 210b, and another alternative adapted third split 810f. The another alternative adapted third split 810f in FIG. 8B has a different modulation format and transmits with a different data rate compared to the adapted third split 510d in the second embedding 500 FIG. 5A.

In order to implement the fourth embedding 802, a modulation format of the third split 210c (depicted in FIG. 2) is modified to provide a data rate of 200 Gbps. For example, to provide a data rate of 200 Gbps the modulation format m may be changed from the original QPSK to 16 QAM. As noted above, the modulation format is one of the transmission configuration elements of the transmission configuration tuple t.

Another alternative adapted third split 810f may be implemented by using the second-type adaptation action $R_2$. Implementation of the another alternative adapted third split 810f does not modify the current spectrum allocation, as long as the reach of the new modulation has a reach that is greater than the length of the lightpath of the third split 210c. The fourth embedding 802 depicted in FIG. 8B is a resource-efficient solution and causes the least disruption compared to the second embedding 500 and the third embedding 800.

Nevertheless, the fourth embedding 802 depicted in FIG. 8B has three splits: first split 210a, second split 210b, and the another alternative adapted third split 810f.

The disruption cost coefficient $c(\bar{e}ptis)$ may be expressed as follows:

$$c(\bar{e}ptis) = \begin{cases} c_0(c_0 = 0), & \text{if } s \text{ is used in the current} \\ & \text{embedding of } \bar{e} \text{ with the same} \\ & \text{tuple } t \text{ on the same path } p \\ c_1(c_1 \gg 0), & \text{if } s \text{ is used in the current} \\ & \text{embedding of } \bar{e} \text{ with a different} \\ & \text{tuple } t \text{ on the same path } p \\ c_2(c_2 \gg c_1), & \text{if } s \text{ is not used in the current} \\ & \text{embedding of } \bar{e} \text{ and is not} \\ & \text{occupied by other virtual links} \\ c_3(c_3 \gg c_2), & \text{if } s \text{ is used in an expansion or} \\ & \text{a contraction operation} \\ c_4(c_4 \gg c_3), & \text{if } s \text{ is used in the current} \\ & \text{embedding of } \bar{e} \text{ on path } p1, \text{ and} \\ & p1 \text{ and } p \text{ have a common link} \\ \infty, & \text{if } s \text{ is currently occupied by} \\ & \text{other virtual links} \end{cases} \quad (6)$$

In expression (6), "s" refers to the frequency slot(s).

It should be noted that in the disruption cost model, as described herein, the cost constants $c_1$, $c_2$, $c_3$ and $c_4$ may be set based on the acceptable levels of disruption and/or additional constraints governing network availability for a particular application and operational priorities. Such requirements and constraints are often a part of service level agreements between the customer and the network service provider. The use of the disruption cost model in methods of selecting from a plurality of possible embeddings allows for a selection process to minimize disruption, both over the VLink in question, but also over the complete physical network 100.

In order to take into account the disruption due to spectrum reconfiguration, such as an expansion of a split bandwidth allocated to a current split, which corresponds to a adaptation action $R_4$, the adaptor 700 may use an expansion of spectrum variable $\mu_{\bar{e}}$. In order to take into account the disruption due to spectrum reconfiguration, such as a reduction of a split bandwidth allocated to the current split, which corresponds to a adaptation action $R_5$, the adaptor 700 may use a reduction of spectrum variable $\sigma_{\bar{e}}$.

The expansion of spectrum variable $\mu_{\bar{e}}$ may be expressed as follows:

$$\mu_{\bar{e}} = \begin{cases} 1, & \text{if the new embedding } \bar{e} \in \bar{E} \text{ has a split that uses} \\ & \text{at least one frequency slot of a current split and} \\ & \text{at least one frequency slot that is not part of} \\ & \text{the current split} \\ 0, & \text{otherwise} \end{cases} \quad (7)$$

The reduction of spectrum variable $\mu_{\bar{e}}$ may be expressed as follows:

$$\sigma_{\bar{e}} = \begin{cases} 1, & \text{if the new embedding } \bar{e} \in \bar{E} \text{ has a split that uses} \\ & \text{at least one frequency slot of a current split and} \\ & \text{does not use all the frequency slots of the} \\ & \text{current split} \\ 0, & \text{otherwise} \end{cases} \quad (8)$$

Since the frequency slots of a split are assigned contiguously, therefore, $\mu_{\bar{e}}$ and $\sigma s_{\bar{e}}$ represent the expansion and reduction of spectral bandwidth of a split, respectively. To derive these two variables, auxiliary variables may be used, such as a first auxiliary variable $o_{\bar{e}ptij}$, a second auxiliary variable $g_{\bar{e}ptij}$, and a third auxiliary variable $z_{\bar{e}ptij}$. The auxiliary variables may be expressed as follows:

$$o_{\bar{e}ptij} = \begin{cases} 1, & \text{if the new embedding } \bar{e} \in \bar{E} \text{ has a split} \\ & i \in N_q \text{ on a physical path } p \in P_{\bar{e}}^k \text{ with a} \\ & \text{tuple } t \in T_{\bar{e}p} \text{ that uses at least one frequency} \\ & \text{slot used by the current split } j \le q_{\bar{e}}^{cur} \\ 0, & \text{otherwise} \end{cases} \quad (9)$$

$$g_{\bar{e}ptij} = \begin{cases} 1, & \text{if the new embedding } \bar{e} \in \bar{E} \text{ has a split} \\ & i \in N_q \text{ on a physical path } p \in P_{\bar{e}}^k \text{ with a} \\ & \text{tuple } t \in T_{\bar{e}p} \text{ that uses at least one frequency} \\ & \text{slot not used by the current split } j \le q_{\bar{e}}^{cur} \\ 0, & \text{otherwise} \end{cases} \quad (10)$$

$$z_{\bar{e}ptij} = \begin{cases} 1, & \text{if the new embedding } \bar{e} \in \bar{E} \text{ has a split} \\ & i \in N_q \text{ on a path } p \in P_{\bar{e}}^k \text{ with a tuple} \\ & t \in T_{\bar{e}p} \text{ that uses all the frequency slots} \\ & \text{used by the current split } j \le q_{\bar{e}}^{cur} \\ 0, & \text{otherwise} \end{cases} \quad (11)$$

These auxiliary variables may be defined using the following set of constraints:

$$\forall p \in P_{\bar{e}}^k, \forall t \in T_{\bar{e}p}, \forall i \in N_q, \forall j \le q_{\bar{e}}^{cur}, \quad (12)$$
$$\forall s \in S : o_{\bar{e}ptij} \ge (y_{\bar{e}ptis} \times y_{\bar{e}pjs}^{cur}),$$

$$\forall p \in P_{\bar{e}}^k, \forall t \in T_{\bar{e}p}, \forall i \in N_q, \forall j \le q_{\bar{e}}^{cur}, \quad (13)$$
$$\forall s \in S : g_{\bar{e}ptij} \ge (y_{\bar{e}ptis} \times (1 - y_{\bar{e}pjs}^{cur})),$$

$$\forall p \in P_{\bar{e}}^k, \forall t \in T_{\bar{e}p}, \forall i \in N_q, \quad (14)$$
$$\forall j \le q_{\bar{e}}^{cur}, \forall s \in S : z_{\bar{e}ptij} \le (y_{\bar{e}ptis} \times y_{\bar{e}pjs}^{cur}).$$

In the equations (12)-(14), $y_{\bar{e}pjs}^{cur}$ is an input variable that indicates the particular frequency slot of a given split being used by the current embedding of the virtual link $\bar{e}$.

A spectral bandwidth of the split may be expanded when both the first and the second auxiliary variables $o_{\bar{e}ptij}$ and $g_{\bar{e}ptij}$ are simultaneously 1. Consequently, the value of $\mu_{\bar{e}}$ is one when both the first and the second auxiliary variables $o_{\bar{e}ptij}$ and $g_{\bar{e}ptij}$ are equal to 1. Hence, the value of $\mu_{\bar{e}}$ may be expressed as follows:

$$\forall p \in P_{\bar{e}}^k, \forall t \in T_{\bar{e}p}, \forall i \in N_q, \forall j \le q_{\bar{e}}^{cur} : \mu_{\bar{e}} \ge (o_{\bar{e}ptij} \times g_{\bar{e}ptij}). \quad (15)$$

The expression (15) is a non-linear expression that may be linearized as follows:

$$\forall p \in P_{\bar{e}}^k, \forall t \in T_{\bar{e}p}, \forall i \in N_q, \forall j \le q_{\bar{e}}^{cur} : \mu_{\bar{e}} \ge (o_{\bar{e}ptij} \times g_{\bar{e}ptij} - 1). \quad (16)$$

Similarly, a bandwidth allocated to one spectral split is reduced if the first auxiliary variable $o_{\bar{e}ptij}$ is equal to 1 and the third auxiliary variable $z_{\bar{e}ptij}$ is equal to zero. Consequently, $\sigma_{\bar{e}}$ for each physical path p, for each tuple t, for each frequency slot i and for each split j may be defined as follows:

$$\forall p \in \mathcal{P}_{\bar{e}}^k, \forall t \in \mathcal{T}_{\bar{e}p}, \forall i \in N_q, \forall j \leq q_{\bar{e}}^{cur} : \sigma_{\bar{e}} \geq (o_{\bar{e}ptij} \times z_{\bar{e}ptij}). \quad (17)$$

Using the cost model described above and the derived variables $\mu_{\bar{e}}$ and $\sigma_{\bar{e}}$, a disruption cost function for an embedding (for example, new embedding 500) may be expressed as follows:

$$Cost_{\bar{e}}^{ds} = \left( \sum_{\forall p \in P_{\bar{e}}^k} \sum_{\forall t \in T_{\bar{e}p}} \sum_{i=1}^{q} \sum_{\forall s \in S} c(\bar{e}ptis) \times y_{\bar{e}ptis} \right) + (\mu_e + \sigma_e) \times c_3 \quad (18)$$

In the expression (18), the sum is calculated for one embedding over all physical paths p of the embedding (in other terms, all physical paths to which the splits of the embedding are mapped), all possible tuples t of all splits i of the embedding, where i is a number between 1 and the maximum number of splits q, and for all frequency slots s of the frequency slot set S of the embedding.

In at least one embodiment, The disruption cost model can be used in methods used to select which modifications are appropriate to minimize a disruption cost function $Cost_{\bar{e}}^{ds}$. Because $\mu_{\bar{e}}$ and $\sigma_{\bar{e}}$ are used in an additive manner in expression (18), the minimal cost may be achieved when both $\mu_{\bar{e}}$ and $\sigma_{\bar{e}}$ are equal to zero. However, in some embodiments, nonzero values of $\mu_{\bar{e}}$ and $\sigma_{\bar{e}}$ may provide embeddings that satisfy the adaptation request with the minimal cost, if embeddings with $\mu_{\bar{e}}$ and $\sigma_{\bar{e}}$ equal to zero are not available.

Using the expression (18), one may determine the disruption cost $Cost_{\bar{e}}^{ds}$ of a candidate embedding which has one or more candidate physical paths, one or more candidate splits that are mapped to the candidate physical path(s), with each candidate split having a transmission configuration tuple, a plurality of allocated candidate frequency slots. The disruption cost $Cost_{\bar{e}}^{ds}$ of the candidate embedding may be determined as a sum of a disruption cost coefficient c($\bar{e}$ptis) multiplied by a frequency slot decision variable $y_{\bar{e}ptis}$ for each candidate split. In some embodiments, the disruption cost of the embedding may be determined by further adding a product of a third cost constant and a sum of an expansion spectrum variable $\mu_{\bar{e}}$ and a reduction of spectrum variable $\sigma_{\bar{e}}$.

Referring again to FIG. 7, after the candidate embeddings have been determined, the analyser routine 734 determines a total cost $Cost_{\bar{e}}^{total}$ for each of the candidate embeddings. In some embodiments, the total cost data may be stored in a cost database 726 or in the candidate database 722. In other embodiments, the analyser routine 734 can select a candidate embedding in accordance with the cost metrics, without storing the costs in a database.

In order to minimize the disruption to the current traffic, the analyser routine 734 select a candidate embedding in accordance with the determined total costs. In some embodiments, the analyser 734 selects an embedding with a cost below a threshold, while in other embodiments, it selects the embedding having the lowest value of the total cost $cost_{\bar{e}}^{total}$. In some embodiments, the total cost may be determined based on a disruption cost in equation (18) as follows:

$$Cost_{\bar{e}}^{total} = Cost_{\bar{e}}^{ds}. \quad (19)$$

In some embodiments, the total cost $Cost_{\bar{e}}^{total}$ may also take into account a transponder cost $Cost_{\bar{e}}^{tr}$. The transponder cost is a cost of adding one or more transponders in order to accommodate (or satisfy) the adaptation request.

In some embodiments, the total cost may also take into account a cost of allocating frequency slots (also referred to herein as "frequency slots allocation cost") $Cost_{\bar{e}}^{sp}$. The cost of allocating slots Cost is independent of the cost of modifying or adding transponders $Cost_{\bar{e}}^{tr}$.

In order to minimize the cost of the adaptation to the new adaptation request, the adaptor 700 minimizes the cost of adding additional transponders, modifying (for example, expanding of) the spectrum, and the cost of service disruption for a VLink 150 that needs to be adapted to the modified data rate. The transponder cost is proportional to the number of splits in the VLink's new embedding. The transponder cost may be expressed as follows:

$$Cost_{\bar{e}}^{tr} = \sum_{\forall p \in P_{\bar{e}}} \sum_{\forall t \in T} \sum_{i=1}^{q} w_{\bar{e}pti} \quad (20)$$

In the expression (20), the sum is calculated over all physical paths p of embedding (in other terms, all physical paths to which the splits of the embedding are mapped), all tuples t of all splits i of the embedding, where i is a number between 1 and the maximum number of splits q. In the expression (20), $w_{\bar{e}pti}$ is the tuple decision variable described above.

Similarly, the spectrum cost (also referred to herein as "frequency slots allocation cost") may be represented using the total frequency slot consumption of the VLink's candidate embedding (for example, second embedding 500 in FIG. 5A). The frequency slot allocation cost may be expressed as follows:

$$cost_{\bar{e}}^{sp} = \sum_{\forall p \in P_{\bar{e}}} \sum_{\forall t \in T} \sum_{i=1}^{q} \sum_{\forall s \in S} y_{\bar{e}ptis} \times |p| \quad (21)$$

In the expression (21), |p| is the number of physical links in the path p The compound sum is calculated for one embedding over all physical paths p of the embedding (e.g. all physical paths to which the splits of the embedding are mapped), all tuples t of all splits i of the embedding, where i is a number between 1 and the maximum number of splits q, and for all frequency slots s of the frequency slot set S of the embedding.

In order to determine a new embedding which may be implemented with the lowest cost, an objective function of optimization of the new embedding may be expressed as follows:

minimize($\theta \times cost_{\bar{e}}^{tr} + w \times cost_{\bar{e}}^{sp} + \sigma \times cost_{\bar{e}}^{ds}$)=minimize($cost_{\bar{e}}^{total}$)  (22)

The objective function (22) minimizes the total cost $Cost_{\bar{e}}^{total}$, where the total cost $Cost_{\bar{e}}^{total}$ may be expressed as follows:

$$Cost_{\bar{e}}^{total} = \theta \times Cost_{\bar{e}}^{tr} + \omega \times Cost_{\bar{e}}^{sp} + \sigma \times Cost_{\bar{e}}^{ds}. \quad (23)$$

The total cost $Cost_{\bar{e}}^{total}$ may be determined as a weighted sum of the cost of transponders, the cost of spectrum and the cost of disruption. A transponder cost weight $\theta$, a frequency slot allocation cost weight $\omega$, and a disruption cost weight $\sigma$ in expression (22) may be modified in order to assign different priorities to the different components based on operational requirements.

Based on the total costs determined for each candidate embedding, the analysing routine selects a new embedding from the candidate embeddings. In one embodiment, new embedding has the lowest total cost of all candidate embeddings. Those skilled in the art will appreciate that in place of the lowest cost, another embodiment may select from the candidate embeddings using other criteria in accordance with the cost.

In at least one embodiment, the new embedding may be determined by an integer linear programming (ILP) formulation using the objective function (22).

Alternatively, the new embedding may be determined using a method described herein below.

In order to re-embed VLink 150 based on an adaptation request 410, are plurality of embeddings are determined. Determining one candidate embedding comprises determining how many candidate splits (subject to a maximum q splits) the candidate embedding may have, and to which physical path(s) the candidate split(s) may be mapped. Each candidate split may be mapped to one of the physical paths of the network 100.

For each candidate split, a candidate transmission configuration may be selected. As discussed above, the candidate transmission configuration is characterised by the candidate transmission configuration tuple t which comprises candidate transmission configuration elements. The candidate transmission configuration elements may be, for example, a data-rate d, a baud rate b, a modulation format m, and a FEC overhead f.

In at least one embodiment, the candidate transmission configuration is selected based on optimization of the objective function (22) of the total cost $Cost_e^{total}$ discussed above.

In other embodiments, adaptor 700, generates one or more candidate embeddings based on all possible combinations of a number of splits, their mapping to physical paths available in network 100, and all possible values of transmission configuration elements that satisfy the new demanded data rate received with the adaptation request 410.

In addition to satisfying the adaptation request, the adaptor 700 to take into account the physical paths of the network 100 and the current embedding (for example, first embedding 200) of the VLink 150 that needs to be adapted. The adaptor 700 may use the currently unallocated frequency slots in the EON 100 and needs to take into account the currently occupied frequency slots, which may be occupied by other virtual links of the EON 100.

Figure 6B:
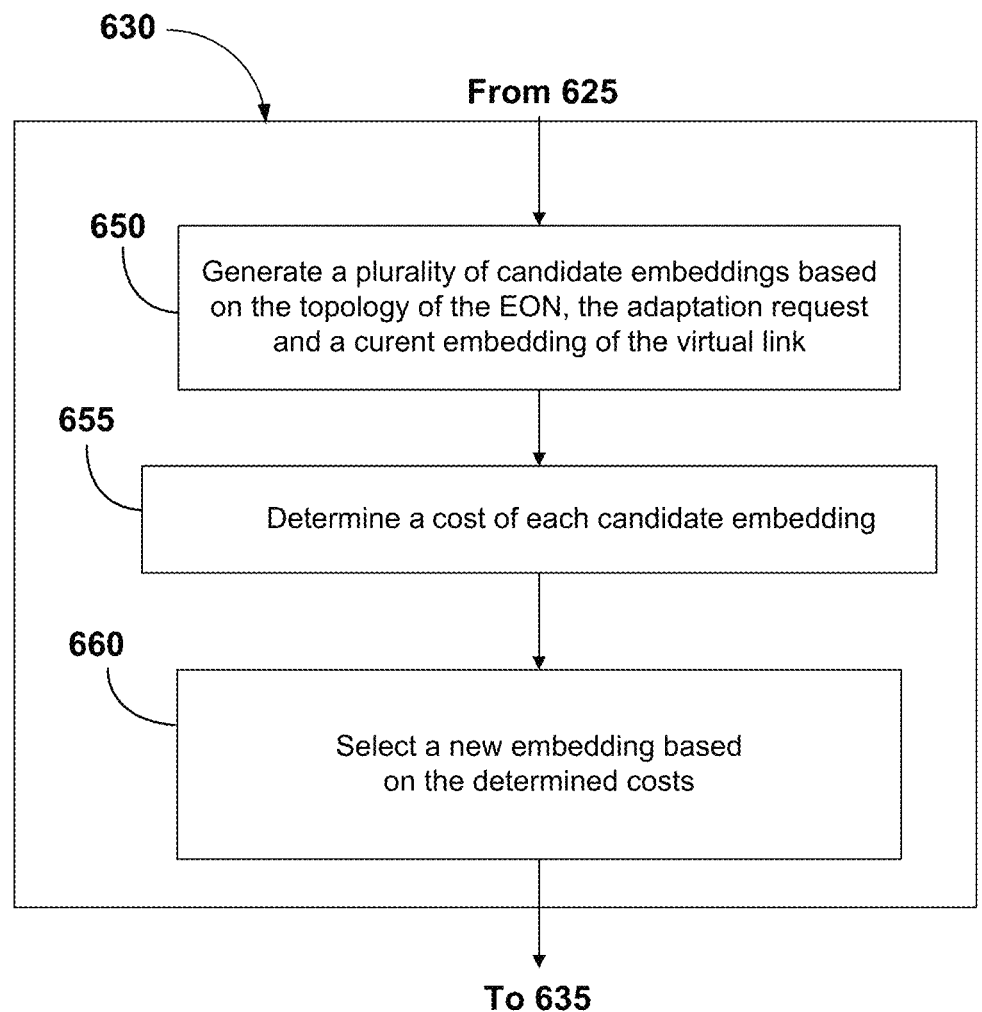
FIG. 6B depicts a flowchart of various steps of the method of FIG. 6A, in accordance with various embodiments of the present disclosure.

FIG. 6B depicts a flowchart of a non-limiting embodiment of the step 630 of the method 600 of FIG. 6A. When describing FIG. 6B, reference will also be made to FIGS. 2, 5, 6A.

At step 650, a plurality of candidate embeddings are generated based on the topology of EON 100, received adaptation request 410, and the current embedding (for example, first embedding 200) of the VLink 150.

At step 655, the total cost $Cost_e^{total}$ of each candidate embedding is determined. Various embodiments of the method of determination of the total cost are discussed above.

At step 660, the a new embedding is selected from the candidate embeddings. The selection of the new embedding is based the total cost of each candidate embedding of the candidate embeddings. In some embodiments, the new embedding has the lowest total cost of all candidate embeddings.

Figure 9:
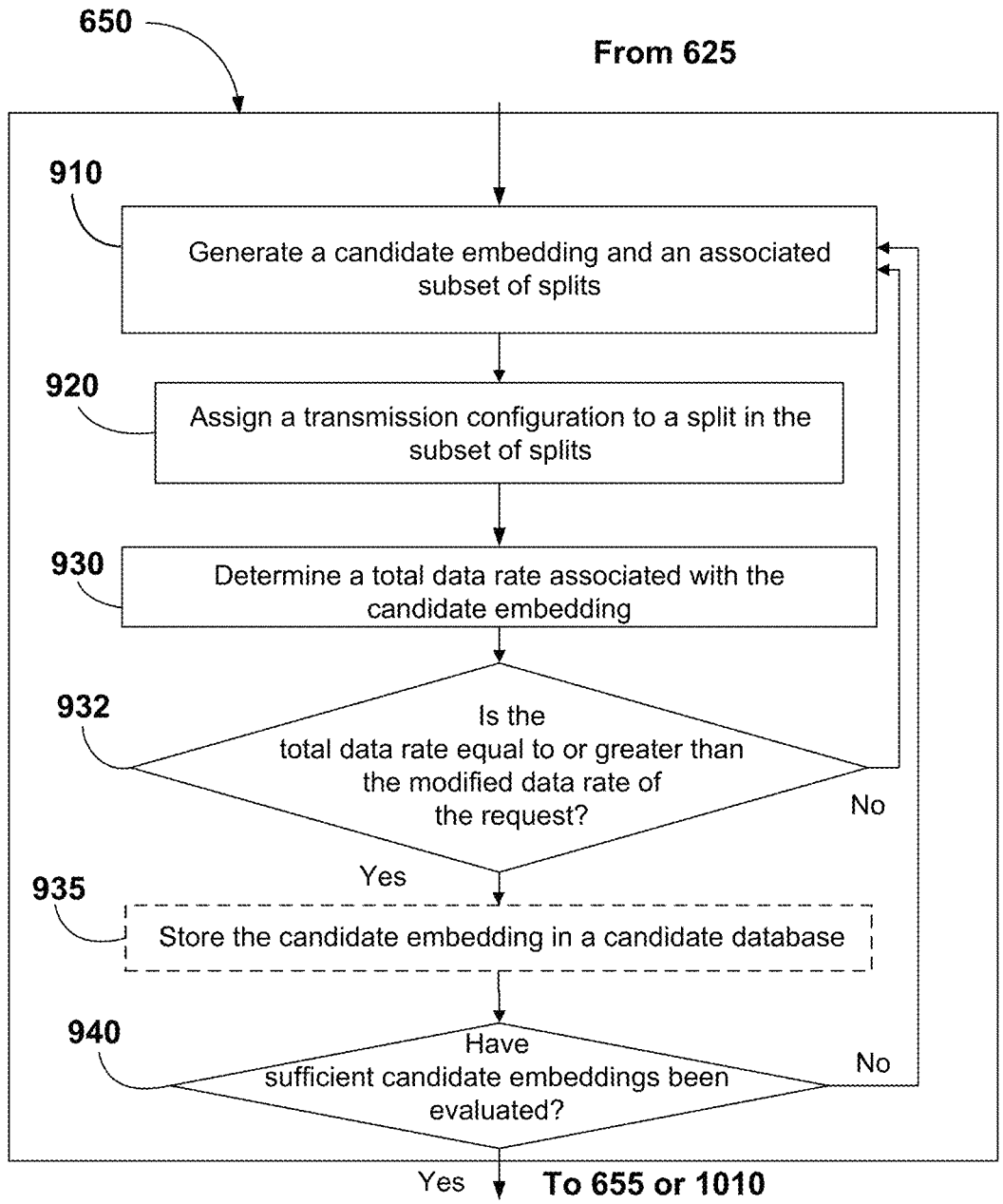
FIG. 9 depicts a flowchart of implementation of one of steps of the method of FIG. 6B, in accordance with various embodiments of the present disclosure.

FIG. 9 is a flowchart illustrating an example of a method for carrying out step 650 of FIG. 6B. When describing FIG. 9, the reference will also be made to FIGS. 2, 5, 6A, 6B.

Referring to FIG. 9, at step 910, a candidate embedding and the splits associated with the embedding are generated. The candidate embedding may be one of the types of embedding classifications discussed above. The splits may be generated using the existing splits of the embedding as a starting point.

In step 920, a new transmission configuration is assigned to at least one split of the preliminary subset of splits. As such, one candidate embedding may have a subset of splits which is identical to the current subset of splits. Another candidate embedding may have one split with a new transmission configuration (for example, with different modulation format) while the other splits of the candidate embedding are identical to the current splits. Yet another candidate embedding may have two or three splits that have a new transmission configuration, etc. When modifying the transmission configuration, one or more transmission configuration elements of the transmission configuration tuple are modified. For example, the data rate and/or the modulation format may be modified.

At step 920, for each split from the candidate subset of splits, a new transmission configuration is assigned. The new transmission configuration has a maximum data rate available when using the existing spectrum allocation of the split on the same path.

To modify the transmission configuration, for each split of the preliminary subset of splits, a new transmission configuration is selected from a reach table. The new transmission configuration is selected such that it has a reach longer than a path length of the physical path (for example, path ACD in FIG. 2) that the current split is embedded on. A split associated with the candidate preliminary embedding has a bandwidth of a plurality of contiguous preliminary frequency slots equal or narrower than a bandwidth that is currently allocated to the current split. The plurality of contiguous preliminary frequency slots refers to the bandwidth allocated to a respective preliminary subset of splits of the preliminary embedding.

In some non-limiting examples, the new (modified) transmission configuration may be identical to the current transmission configuration. If the current split is already using an optimal configuration subject to the reach limitations of the transmission configuration tuple there is no need to change it. An optimal configuration is one that provides the best possible combination of parameters that satisfy the distance requirements of the VLink to be embedded.

In some non-limiting examples, transmission configurations of all the splits in the candidate embedding may remain unchanged compared to the current transmission configuration. In other words, such preliminary embedding would be identical to the current embedding of VLink. If there are no changes in the capacity of an embedding it may be discarded.

At step 930, for a given preliminary subset of splits of the VLink 150, and therefore, for a given candidate embedding, a preliminary total data rate for the candidate embedding across the subset of splits is determined. For example, referring to FIG. 5, when the first split 210a is capable of operating at 200 Gbps, the second split 210b is capable of operating at 100 Gbps, and a third adapted split 510d is capable of operating at 200 Gbps, the total data rate of the second embedding 500 is: 200 Gbps+100 Gbps+200 Gbps=500 Gbps.

Referring to FIG. 9, at step 932, a verification of whether the total data rate determined for the candidate embedding is equal to or higher than the modified data rate specified in the adaptation request. If the data rate is not sufficient, the candidate can be discarded, and a new candidate can be generated.

After determining the preliminary embedding that satisfies the data rate specified in the adaptation request and is different from the current embedding, such preliminary embedding is optionally stored in candidates database 722.

At step 940, a determination is made was to whether there are further embeddings to evaluate. If there are more embeddings to evaluate, the process re-starts. Otherwise the process ends, and the method carries on to step 655. It should be understood that the search need not be exhaustive, and that only a sufficient number of candidates need to be generated in some embodiments.

Figure 10A:
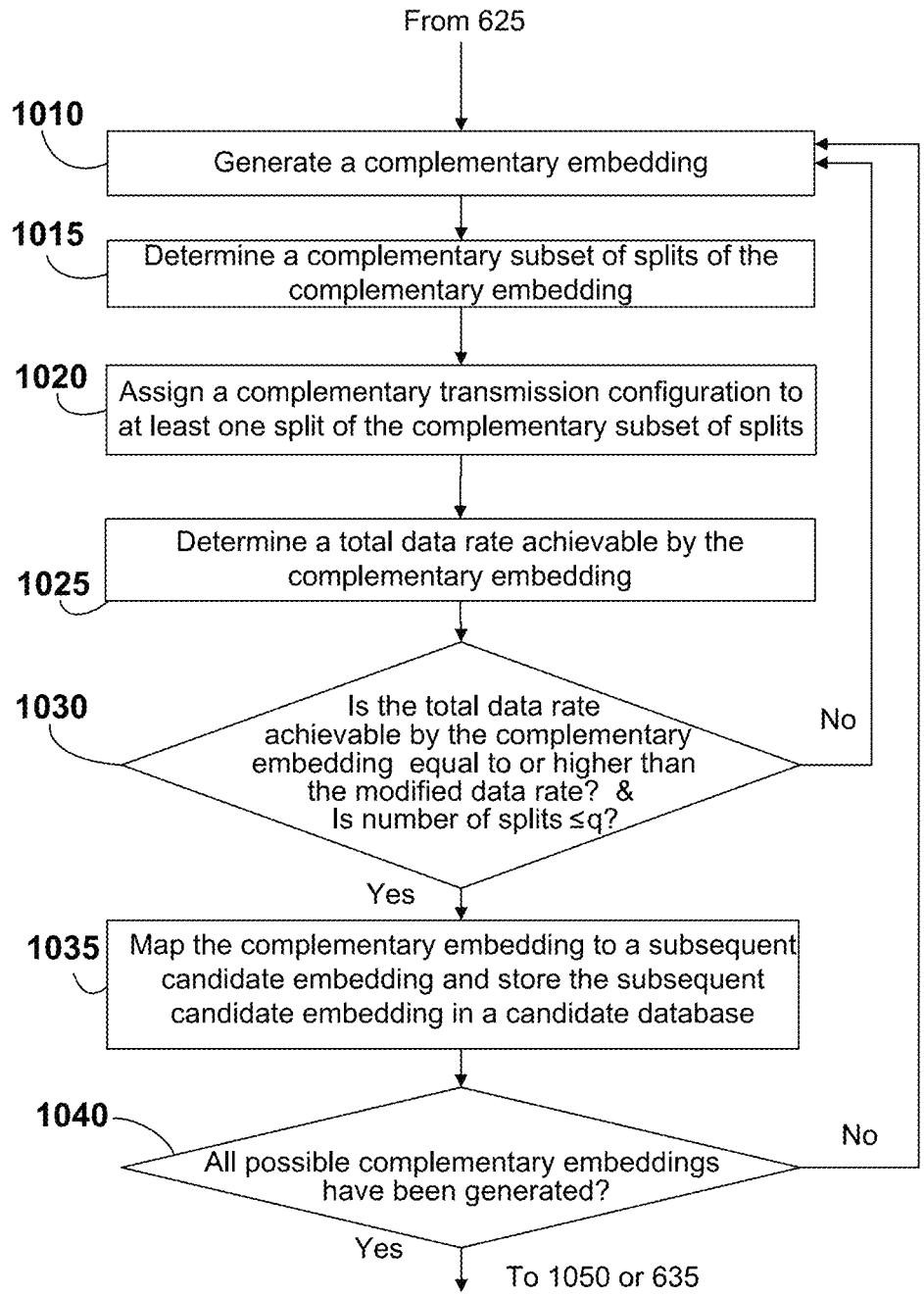
FIG. 10A depicts various additional steps of the method of FIG. 6B, in accordance with various embodiments of the present disclosure.
Figure 10B:
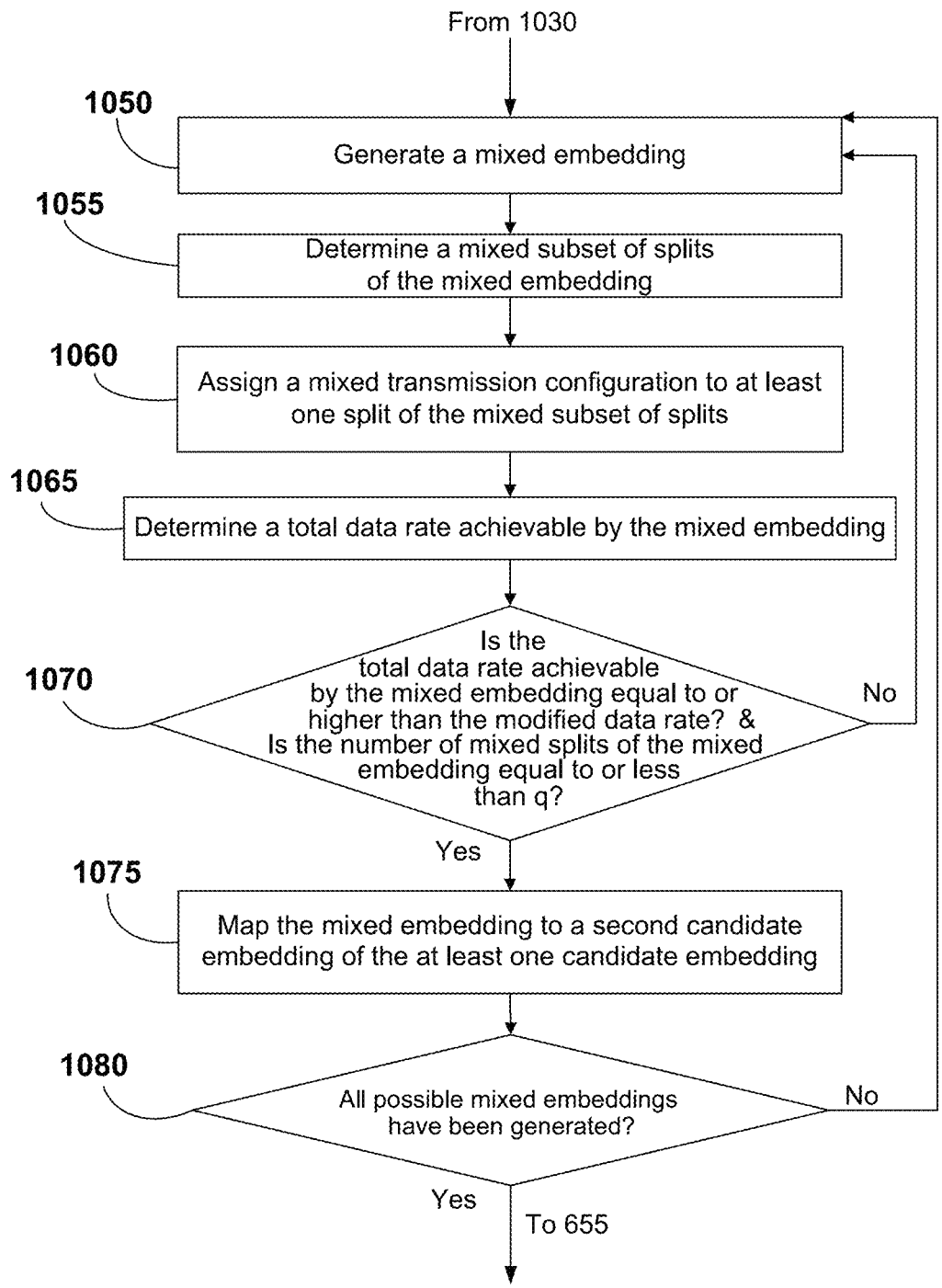
FIG. 10B depicts various additional steps of the method of FIG. 6B, in accordance with various embodiments of the present disclosure.

FIGS. 10A and 10B depict various additional steps of the method 600 for adaptation of embedding of a VLink 150 to a modified data rate, in accordance with various embodiments of the present disclosure.

In some embodiments network adaptation controller 300 applies adaptation actions of types $R_3$, $R_4$, $R_5$, and $R_6$ to the various splits in order to determine the candidate embeddings. The adaptation actions of types $R_3$, $R_4$, $R_5$, $R_6$ change spectrum allocation of the splits.

The network adaptation controller 300 may generate one or more complementary embeddings. Each complementary embedding has splits with frequency slots that do not overlap with current frequency slots allocated for and used by any current split. Such complementary embeddings have splits that are generated using adaptation actions of third adaptation action type $R_3$. In other terms, a complementary embedding has one or more $R_3$-type candidate splits.

At step 1010, the complementary embedding is generated and has a complementary subset of splits.

At step 1015, the complementary subset of splits is determined based on the current subset of splits and based on frequency slots unallocated to the current embedding of the virtual link and unallocated to any other virtual link of the plurality of virtual links of the EON 100. In other terms, the complementary subset of splits are generated such that the frequency slots used by the complementary subset of splits are the frequency slots that are not currently occupied by the virtual link 150 or by any other virtual link of the EON 100.

At step 1020, a transmission configuration is assigned to at least one split of the complementary subset of splits. The transmission configuration is assigned such as it has a reach longer than or equal to the path length of the current physical path of the at least one split of the current subset of splits.

At step 1025, a total data rate achievable by the complementary embedding is determined.

At step 1030, it is determined whether the total data rate achievable by the complementary embedding is equal to or higher than the modified data rate of the adaptation request. If it is determined that the data rate requirement is not met the embedding is discarded and the process returns to 1010. Otherwise the process continues to 1035.

At step 1035, if the number of complementary splits is less than the maximum number of splits and if the total data rate achievable by the complementary embedding is equal to or higher than the modified data rate of the adaptation request, the complementary embedding is stored as a candidate embedding.

At step 1040 it is determined if all complementary embedding have been evaluated. If there are other complementary embeddings to be evaluated, the [process returns to step 1010. Otherwise it proceeds to either step 1050 or 635

Referring now to FIG. 10B, at step 1050, a mixed embedding is generated. A mixed embedding is an embedding that is different from the complementary embedding discussed above. The mixed embedding is generated using adaptation actions of fourth, fifth and sixth adaptation action types $R_4$, $R_5$, and $R_6$. Each mixed embedding can have a mixed subset of splits.

At step 1055, a subset of splits associated with the mixed embedding is determined. This determination made be based on: the current subset of splits of the current embedding, contiguous current frequency slots of the current embedding, and frequency slots that are unallocated to the current embedding of the virtual link and unallocated to any other virtual link of the plurality of virtual link of the EON.

The contiguous mixed frequency slots of each one of the at least one split of the mixed subset of splits comprise at least one of the current contiguous frequency slots and frequency slots that are unallocated to the current embedding of the virtual link and unallocated to any other virtual link of the plurality of virtual link of the EON.

At step 1060, a mixed transmission configuration is assigned to at least one split of the mixed subset of splits. The mixed transmission configuration has a reach longer than or equal to a path length of the current physical path of the at least one split of the mixed subset of splits. The mixed transmission configuration may be assigned in a manner as described above with respect to assigning a new transmission configuration to the preliminary embeddings. For example, a reach table may be used to assign a new transmission configuration (also referred to herein as a "mixed transmission configuration" when referring to the mixed subset of splits of the mixed embedding). The mixed transmission configuration may be selected such that it has a reach longer than a path length of the physical path (for example, path ACD in FIG. 2) that the current split is embedded on.

At step 1065, a total data rate achievable by the mixed embedding is determined.

At step 1070, a determination of whether the total data rate achievable by the mixed embedding is equal to or higher than the modified data rate that was received with the adaptation request 410, and whether a number of mixed splits of the mixed embedding is equal to or less than the maximum number of splits is made.

In response to the total data rate achievable by the mixed embedding being equal to or higher than the modified data rate, and in response to a number of mixed splits of the mixed embedding being equal to or less than the maximum number of splits, the the mixed embedding can be stored as a candidate embedding.

In some embodiments, when generating the complementary embeddings, the network adaptation controller 300 may remove from the preliminary embedding at least one preliminary split corresponding to the current split. At the same time, the network adaptation controller 300 may mark, as being unallocated, at least one preliminary frequency slot corresponding to the at least one preliminary split that was removed.

When changing the spectrum allocation in the mixed embedding, splits with frequency slots may overlap with the current frequency slots allocated to one or more current splits of the current embedding of the EON 100. Generating mixed embeddings correspond to adaptation actions $R_4$ to $R_6$ described above.

It should be noted that when executing steps of FIG. 10B, the frequency slots of the splits of the current embedding are considered to be available for the use by the mixed embeddings. For example, the frequency slots of all current splits may be marked as unallocated or as available at step 1050. After one or more mixed embeddings are determined, the frequency slots of the current splits of the current embedding are marked as being "allocated". Marking as available of the frequency slots of the currently allocated splits may result in overlaps between the frequency slots of the current splits and new potential splits of the mixed embeddings, as described above. Due to such overlap, the MBB technique may not be used when implementing the embedding in the EON, thus causing high level of disruptions and therefore increasing the total cost of the mixed embedding. However, such solutions may be the last resort in extremely resource-constrained scenarios, where embeddings without spectral overlap with current splits of the current embedding of the VLink are not feasible.

As described above, adaptation actions $R_3$ to $R_6$ cause moderate to high disruption of the EON 100, because the adaptation actions $R_3$ to $R_6$ involve re-allocation of the spectrum or new split setup. Following the execution of steps 1010-1070, the candidates database 722 comprises all possible embeddings of the VLink 150 that satisfy the adaptation request 410.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method of adapting a virtual link in an optical network comprising:
   receiving an adaptation request for a virtual link within a virtual network embedded on an optical substrate network;
   generating a plurality of candidate embeddings based on a topology of the optical substrate network and a current embedding of the virtual link, each candidate embedding of the plurality of candidate embeddings satisfying the adaptation request;
   determining a total cost for each candidate embedding in the plurality of candidate embeddings, each total cost determined in accordance with a disruption cost associated with the respective candidate embedding, wherein determining the total cost for each candidate embedding comprises determining a weighted sum of the disruption cost associated with the respective candidate embedding, a transponder cost for the respective candidate embedding, and a frequency slot allocation cost for the respective candidate embedding; and
   selecting a candidate embedding from the plurality of candidate embeddings in accordance with the determined total cost of the selected candidate embedding.

2. The method of claim 1, wherein the current embedding comprises current splits, each current split having a current transmission configuration, and wherein generating the plurality of candidate embeddings further comprises:
   generating a plurality of preliminary embeddings, each preliminary embedding of the plurality of preliminary embeddings having a preliminary subset of splits; and
   for each preliminary embedding:
   determining the preliminary subset of splits based on a current subset of splits of the current embedding, contiguous preliminary frequency slots of each one of the at least one split of the preliminary subset of splits being identical to contiguous current frequency slots of a respective current split,
   assigning a new transmission configuration to at least one split of the preliminary subset of splits, the new transmission configuration having a reach longer than a path length of a physical path of a given split of the preliminary subset of splits;
   determining a total data rate achievable by the preliminary embedding; and
   responsive to determining that the total data rate is equal to or higher than a modified data rate received in the adaptation request, mapping the preliminary embedding to a first candidate embedding of the plurality of candidate embeddings.

3. The method of claim 2, wherein assigning the new transmission configuration comprises selecting the new transmission configuration from a reach table.

4. The method of claim 2, further comprising:
   generating a plurality of complementary embeddings, each complementary embedding having a complementary subset of splits; and
   for each complementary embedding:
   determining the complementary subset of splits based on the current subset of splits and based on frequency slots unallocated to the current embedding of the virtual link and unallocated to any other virtual link of the optical network,
   all of the at least one complementary contiguous frequency slot of each split of the complementary subset of splits being currently unallocated to the virtual link and unallocated to any other virtual link of the optical network;
   assigning a transmission configuration to at least one split of the complementary subset of splits, the transmission configuration of the at least one split of the complementary subset of splits having a reach longer than or equal to the path length of the physical path of the at least one split of the complementary subset of splits;
   determining a total data rate achievable by the complementary embedding; and
   in response to the total data rate achievable by the complementary embedding being equal to or higher than the modified data rate, and in response to a number of complementary splits being equal to or less than the maximum number of splits, mapping the complementary embedding to a second candidate embedding of the plurality of candidate embeddings.

5. The method of claim 4, wherein the disruption cost is determined based on a disruption cost coefficient, and the disruption cost coefficient assigned to the first candidate embedding is higher than the disruption cost coefficient assigned to the second candidate embedding.

6. The method of claim 4, further comprising:
   generating at least one mixed embedding, each mixed embedding having a mixed subset of splits; and
   for each mixed embedding:
   determining the mixed subset of splits based on:
   the current subset of splits,
   current contiguous frequency slots, and
   frequency slots that are unallocated to the current embedding of the virtual link and unallocated to any other virtual link of the optical network, contiguous mixed frequency slots of each one of the at least one split of the mixed subset of splits comprising at least one of the contiguous current frequency slots and frequency slots that are unallocated to the current embedding of the virtual link and unallocated to any other virtual link of the optical network;

assigning a mixed transmission configuration to at least one split of the mixed subset of splits, the mixed transmission configuration having a reach longer than or equal to a path length of the physical path of the at least one split of the mixed subset of splits;

determining a total data rate achievable by the mixed embedding; and in response to the total data rate achievable by the mixed embedding being equal to or higher than the modified data rate, and in response to a number of mixed splits of the mixed embedding being equal to or less than the maximum number of splits, mapping the mixed embedding to a third candidate embedding of the plurality of candidate embeddings.

7. The method of claim 6, wherein the disruption cost is determined based on a disruption cost coefficient, and the disruption cost coefficient assigned to the second candidate embedding is higher than the disruption cost coefficient assigned to the first candidate embedding.

8. A network controller comprising:
a processor for executing instructions; and
a memory for storing instructions, which when executed by the processor configure the system to perform operations comprising:
receiving an adaptation request for a virtual link within a virtual network embedded on an optical substrate network;
generating a plurality of candidate embeddings based on a topology of the optical substrate network and a current embedding of the virtual link, each candidate embedding of the plurality of candidate embeddings satisfying the adaptation request;
determining a total cost for each candidate embedding in the plurality of candidate embeddings, each total cost determined in accordance with a disruption cost associated with the respective candidate embedding, wherein determining the total cost for each candidate embedding comprises determining a weighted sum of the disruption cost associated with the respective candidate embedding, a transponder cost for the respective candidate embedding, and a frequency slot allocation cost for the respective candidate embedding; and
selecting a candidate embedding from the plurality of candidate embeddings in accordance with the determined total cost of the selected candidate embedding.

9. The network controller of claim 8, wherein the network is an elastic optical network, and wherein the candidate embedding comprises at least one physical path, at least one split being mapped to the at least one physical path, each split having a transmission configuration tuple, each candidate split having at least one f contiguous allocated candidate frequency slot, and, wherein the disruption cost of the candidate embedding is a sum of the disruption costs associated with each split and the disruption costs of a split being a product of a disruption cost coefficient $c(\bar{e}ptis)$ multiplied by a frequency slot decision variable $y_{\bar{e}ptis}$.

10. The network controller of claim 8, wherein the instructions, when executed by the processor, further configure the system to perform operations comprising:

generating a plurality of complementary embeddings, each complementary embedding having a complementary subset of splits; and for each complementary embedding:
determining the complementary subset of splits based on the current subset of splits and based on frequency slots unallocated to the current embedding of the virtual link and unallocated to any other virtual link of the optical network, all of the at least one complementary contiguous frequency slot of each split of the complementary subset of splits being currently unallocated to the virtual link and unallocated to any other virtual link of the optical network;

assigning a transmission configuration to at least one split of the complementary subset of splits, the transmission configuration of the at least one split of the complementary subset of splits having a reach longer than or equal to the path length of the physical path of the at least one split of the complementary subset of splits;

determining a total data rate achievable by the complementary embedding; and in response to the total data rate achievable by the complementary embedding being equal to or higher than the modified data rate, and in response to a number of complementary splits of the new candidate embedding being equal to or less than a maximum number of splits, mapping the complementary embedding to a second candidate embedding of the plurality of candidate embeddings.

11. A method of adapting a virtual link in an Elastic Optical Network (EON) comprising:
receiving an adaptation request for a virtual link within a virtual network embedded on an optical substrate network;
generating a plurality of candidate embeddings based on a topology of the optical substrate network and a current embedding of the virtual link, each candidate embedding of the plurality of candidate embeddings satisfying the adaptation request;
determining a total cost for each candidate embedding in the plurality of candidate embeddings, each total cost determined in accordance with a disruption cost associated with the respective candidate embedding; and
selecting a candidate embedding from the plurality of candidate embeddings in accordance with the determined total cost of the candidate embedding, wherein:
the candidate embedding comprises at least one physical path, at least one split being mapped to the at least one physical path, each split having a transmission configuration tuple, each split having at least one contiguous frequency slot,
a disruption cost of the candidate embedding is a sum of disruption costs associated with each split, and a disruption cost of a split being a product of a disruption cost coefficient $c(\bar{e}ptis)$ multiplied by a frequency slot decision variable $y_{\bar{e}ptis}$, and
the disruption cost of the candidate embedding is further determined by multiplying the sum of the disruption costs associated with each split by a product of a third cost constant and a sum of an expansion spectrum variable $\mu_{\bar{e}}$ and a reduction of spectrum variable $\sigma_{\bar{e}}$.

12. The method of claim 11, wherein:
the disruption cost coefficient $c(\bar{e}ptis)$ of a candidate split is zero if a candidate physical path of the candidate split coincides with a respective current physical path, a transmission configuration tuple that is identical to a transmission configuration tuple of the candidate split of a respective current split, and each candidate frequency slot of the at least one contiguous candidate frequency slot of the candidate split coincides with one current frequency slot of at least one current contiguous frequency slot allocated to the respective current split;

the disruption cost coefficient $c(\bar{e}ptis)$ of the candidate split is equal to a first cost constant if at least one element of one transmission configuration tuple of the candidate split differs from a respective element of the transmission configuration tuple of the respective current split, and each candidate frequency slot of the candidate split coincides with a respective one current frequency slot of the respective current split;

the disruption cost coefficient $c(\bar{e}ptis)$ of the candidate split is equal to a second cost constant if each one of the at least one candidate contiguous frequency slot of the candidate split is mapped to one of unallocated contiguous frequency slots, the unallocated contiguous frequency slots being unallocated to any virtual link of a plurality of virtual links of the EON, the second cost constant being larger than the first cost constant;

the disruption cost coefficient $c(\bar{e}ptis)$ of the candidate split is equal to a third cost constant if the candidate physical path coincides with the current physical path, and at least one of the at least one candidate contiguous frequency slot of the candidate split overlaps with at least one current frequency slot allocated to the current split and overlaps with at least one of the plurality of currently unallocated contiguous frequency slots, the third cost constant being larger than the second cost constant;

the disruption cost coefficient $c(\bar{e}ptis)$ of the candidate split is equal to the third cost constant if: the candidate physical path coincides with the current physical path, each one of the at least one of candidate frequency slots of the candidate split comprises at least one current frequency slot, and a candidate spectral bandwidth of the candidate split is narrower than a current spectral bandwidth of the respective current split;

the disruption cost coefficient $c(\bar{e}ptis)$ of the candidate split is equal to a fourth cost constant if the candidate spectral bandwidth of the candidate split at least partially overlaps with the current spectral bandwidth of the current split of the virtual link, the fourth cost constant being larger than the third cost constant; and the disruption cost coefficient $c(\bar{e}ptis)$ of the candidate split is significantly larger than the fourth cost constant if the candidate spectral bandwidth overlaps with at least one of an allocated plurality of frequency slots that is allocated to one of the plurality of virtual links of the EON.

\* \* \* \* \*